(12) United States Patent  
Ulmen et al.

(10) Patent No.: US 11,597,463 B2  
(45) Date of Patent: Mar. 7, 2023

(54) ELECTRIC-POWERED PERSONAL TRANSPORT VEHICLE

(71) Applicant: Neutron Holdings, Inc., San Francisco, CA (US)

(72) Inventors: John Ulmen, Emerald Hills, CA (US); Sean Michael Flanigan, San Jose, CA (US); Mark Frykman, Durham, NC (US); Levi Jacob Price, Boulder Creek, CA (US); Oliver Riihiluoma, San Francisco, CA (US); Barrett Heyneman, San Jose, CA (US); Jason Bluhm, Renton, WA (US); Mike McHugh, Pacifica, CA (US); Jeff Russakow, Los Altos, CA (US); Jukka Rautiainen, Espoo (FI); Noriko Morimoto, Lafayette, CA (US); Julian Farnam, Livermore, CA (US)

(73) Assignee: NEUTRON HOLDINGS, INC., San Francisco, CA (US)

(*) Notice: Subject to any disclaimer, the term of this patent is extended or adjusted under 35 U.S.C. 154(b) by 271 days.

(21) Appl. No.: 16/811,989

(22) Filed: Mar. 6, 2020

(65) Prior Publication Data  
US 2020/0283086 A1 Sep. 10, 2020

Related U.S. Application Data

(60) Provisional application No. 62/815,862, filed on Mar. 8, 2019.

(51) Int. Cl.  
*B62K 11/14* (2006.01)  
*B60L 50/60* (2019.01)  
*B62K 23/02* (2006.01)

(52) U.S. Cl.  
CPC .............. *B62K 11/14* (2013.01); *B60L 50/60* (2019.02); *B62K 23/02* (2013.01); *B60L 2200/24* (2013.01); *B62K 2202/00* (2013.01)

(58) Field of Classification Search  
CPC .................................................. B60L 2200/24  
See application file for complete search history.

(56) References Cited

U.S. PATENT DOCUMENTS 4,394,029 A 7/1983 Holmgren  
5,561,734 A * 10/1996 Simonsen .............. H01C 10/00  
388/838

(Continued)

FOREIGN PATENT DOCUMENTS

CN 205891129 U 1/2017  
CN 107054539 A 8/2017

(Continued)

*Primary Examiner* — Vicky A Johnson  
(74) *Attorney, Agent, or Firm* — Dentons US LLP

(57) ABSTRACT

An electric-powered personal transport vehicle with a board to support a weight of a user and one or more wheels driven by one or more electric motors is discussed. The electric motors are powered by one or more batteries. A throttle has a thumb wheel speed controller on a handlebar. The thumb wheel speed controller has a horizontal manipulation between accelerate, neutral, and brake input positions such that pressing the thumbwheel speed controller in a vertical direction will not result in an unintentional acceleration or braking.

20 Claims, 14 Drawing Sheets

(56) References Cited

U.S. PATENT DOCUMENTS

| | | | | |
|---|---|---|---|---|
| 5,590,564 | A * | 1/1997 | Kishimoto | B62M 25/04 |
| | | | | 74/108 |
| 5,775,452 | A * | 7/1998 | Patmont | B62K 3/002 |
| | | | | 180/181 |
| 6,276,230 | B1 | 8/2001 | Crum et al. | |
| 6,581,714 | B1 * | 6/2003 | Kamen | B62D 51/00 |
| | | | | 338/50 |
| 6,907,949 | B1 * | 6/2005 | Wang | B60L 50/66 |
| | | | | 180/19.1 |
| 9,795,864 | B1 | 10/2017 | Bao | |
| 2003/0074997 | A1 * | 4/2003 | Wesling | F16H 59/02 |
| | | | | 74/473.12 |
| 2004/0007398 | A1 | 1/2004 | Amsbury et al. | |
| 2007/0080934 | A1 | 4/2007 | Chen et al. | |
| 2014/0090916 | A1 | 4/2014 | Lovley, II et al. | |
| 2015/0266534 | A1 | 9/2015 | Lovley, II et al. | |
| 2015/0370256 | A1 | 12/2015 | Erhart et al. | |
| 2017/0190335 | A1 * | 7/2017 | Gillett | B62K 17/00 |

FOREIGN PATENT DOCUMENTS

| | | |
|---|---|---|
| EP | 1943122 B1 | 5/2007 |
| JP | 2007-64104 A | 3/2007 |
| KR | 10-2016-0087674 A | 7/2016 |
| WO | 2018/172308 A1 | 9/2018 |
| WO | 2018/172308 A4 | 9/2018 |
| WO | 2019012319 A1 | 1/2019 |

\* cited by examiner

100

100

100

100

ELECTRIC-POWERED PERSONAL TRANSPORT VEHICLE

RELATED APPLICATION

This application claims the benefit under 35 USC 119 of U.S. Provisional Patent Application No. 62/815,862, filed Mar. 8, 2019, titled "A Light Electric Vehicle," which is hereby incorporated herein by reference in its entirety.

FIELD

Embodiments of the design provided herein generally relate to an electric personal transport vehicle, such as an electric-powered personal transport vehicle (electric-powered personal transport vehicle), having various improvements.

BACKGROUND

People need a better mechanism and supporting system to move around safely without the vulnerabilities of traditional electric-powered personal transport vehicles.

SUMMARY

Provided herein are some embodiments. In an embodiment, the design is directed to an electric-powered personal transport vehicle, a mobile application, and a backend support system for use with the electric-powered personal transport vehicle, such as an electric-powered scooter.

In an embodiment, an electric-powered personal transport vehicle with a board to support a weight of a user and one or more wheels driven by one or more electric motors is discussed. The electric motors are powered by one or more batteries. A throttle has a thumb wheel speed controller on a handlebar. The thumb wheel speed controller has a horizontal manipulation between accelerate, neutral, and brake input positions such that pressing the thumbwheel speed controller in a vertical direction will not result in an unintentional acceleration or braking.

These and other features of the design provided herein can be better understood with reference to the drawings, description, and claims, all of which form the disclosure of this patent application.

DRAWINGS

The drawings refer to some embodiments of the design provided herein. The electric-powered personal transport vehicle may have many features. For example, the referenced example figures show:

FIGS. 6 and 7 illustrate a diagram of an example embodiment of an electric-powered personal transport vehicle having a throttle on the handlebar. FIG. 7 is an exploded view of the thumbwheel speed controller in FIG. 6.

Figure 9C:
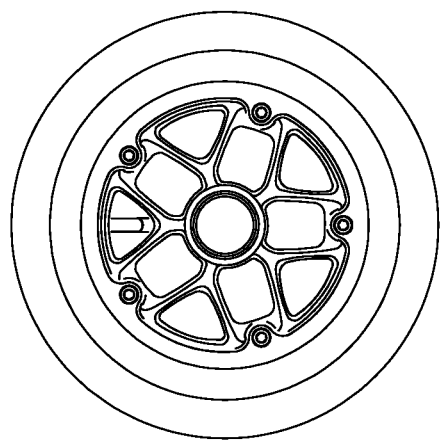
Figure 9B:
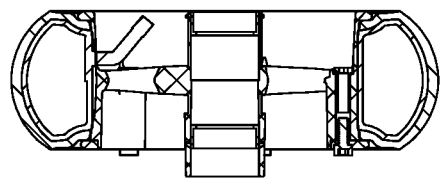
Figure 9A:
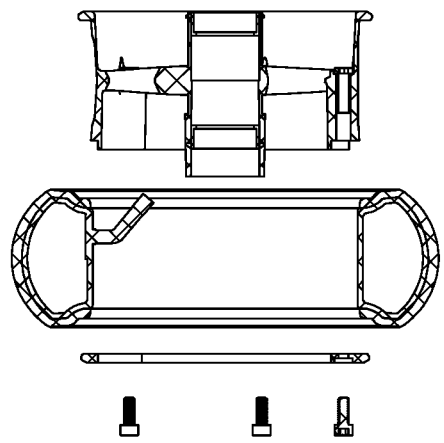

FIGS. 9A-9C illustrate a diagram of an example embodiment of a multiple piece split rim of an electric-powered personal transport vehicle. FIG. 9A shows the oval tire in the middle of the two pieces making up the split rim. FIG. 9B shows the two pieces making up the split rim with the tire installed. FIG. 9C shows a side perspective of the two pieces making up the split rim with the tire installed.

Figure 10:
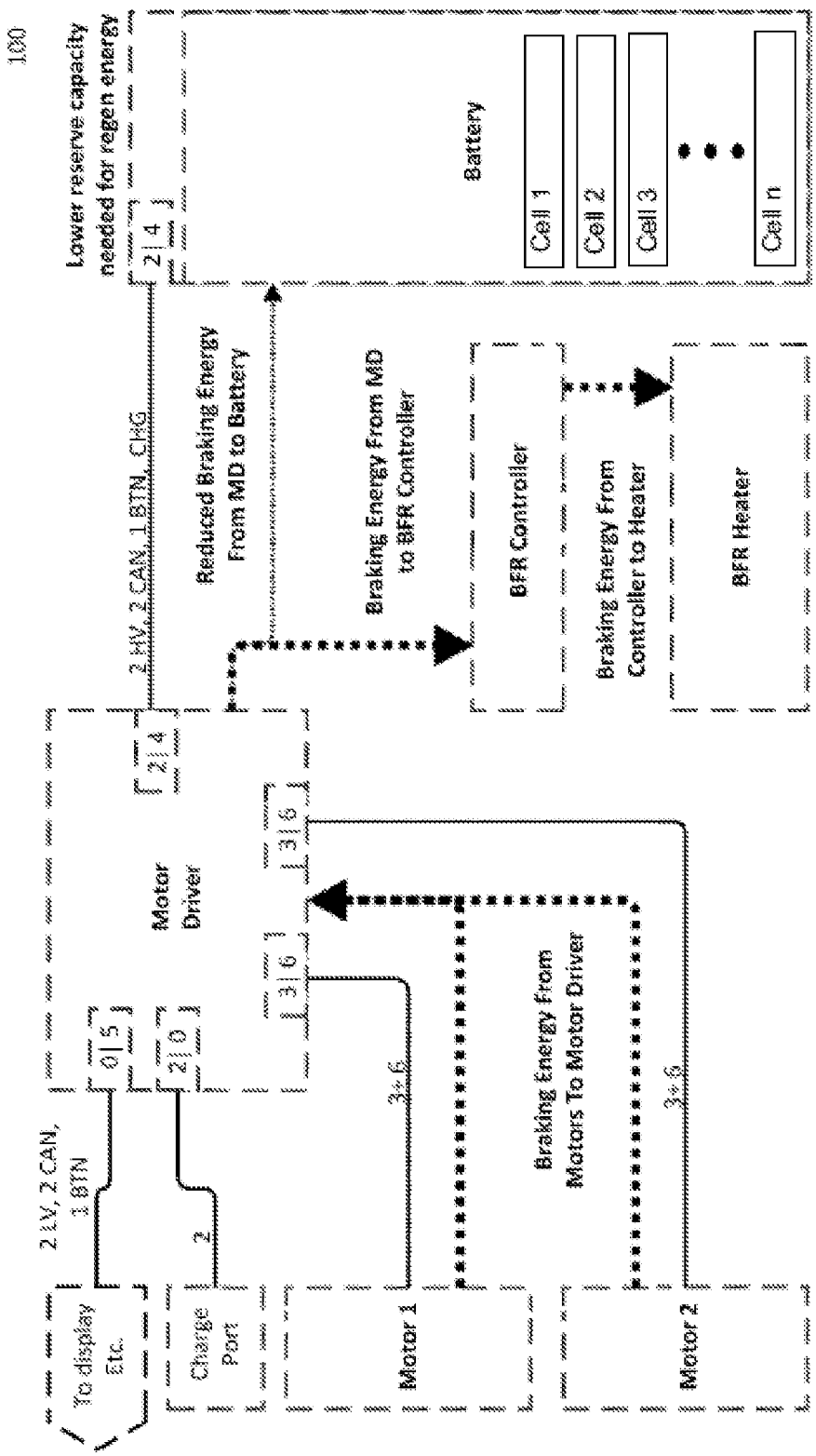

FIG. 10 illustrates a block diagram of an example embodiment of a heat and energy transference throughout an electric-powered personal transport vehicle.

Figure 11:
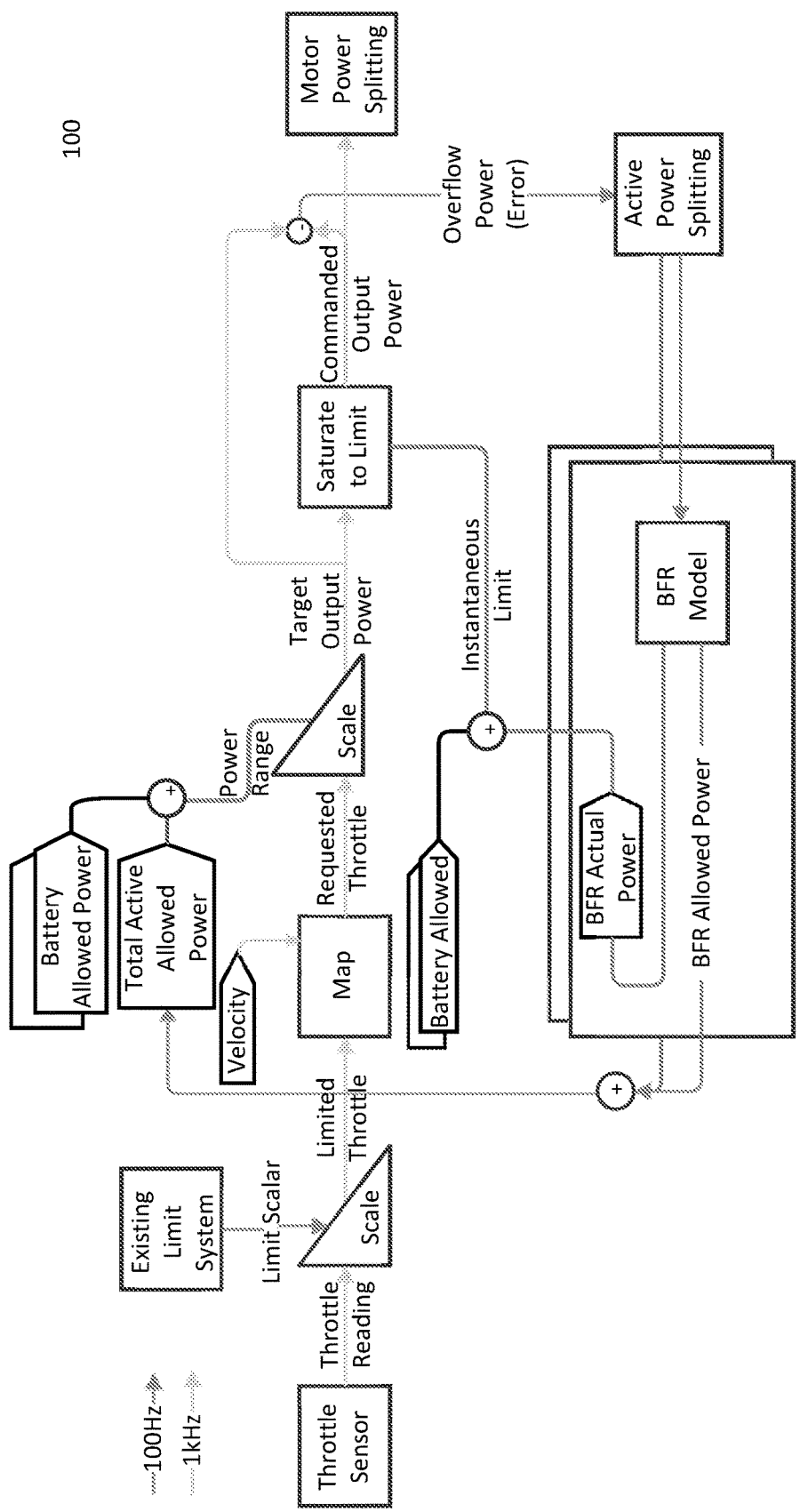

FIG. 11 illustrates a diagram of an example embodiment of the heat dissipation controller determining the power distribution between the battery cells and the frame when braking to ensure no battery cell exceeds a temperature limit and a charge limit for that battery cell by heat dissipation of the excess power into the frame of the electric-powered personal transport vehicle via the heat dissipation mechanism.

Figure 12:
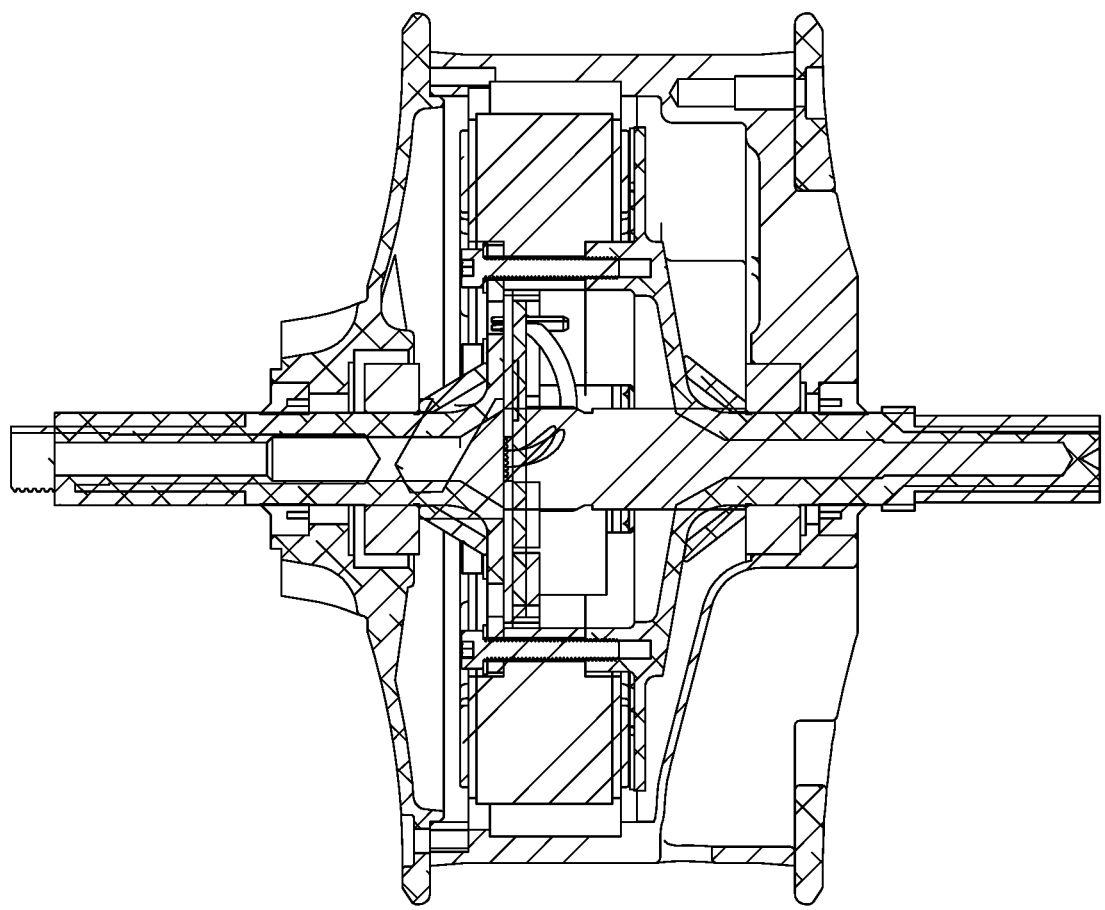
Figure 13:
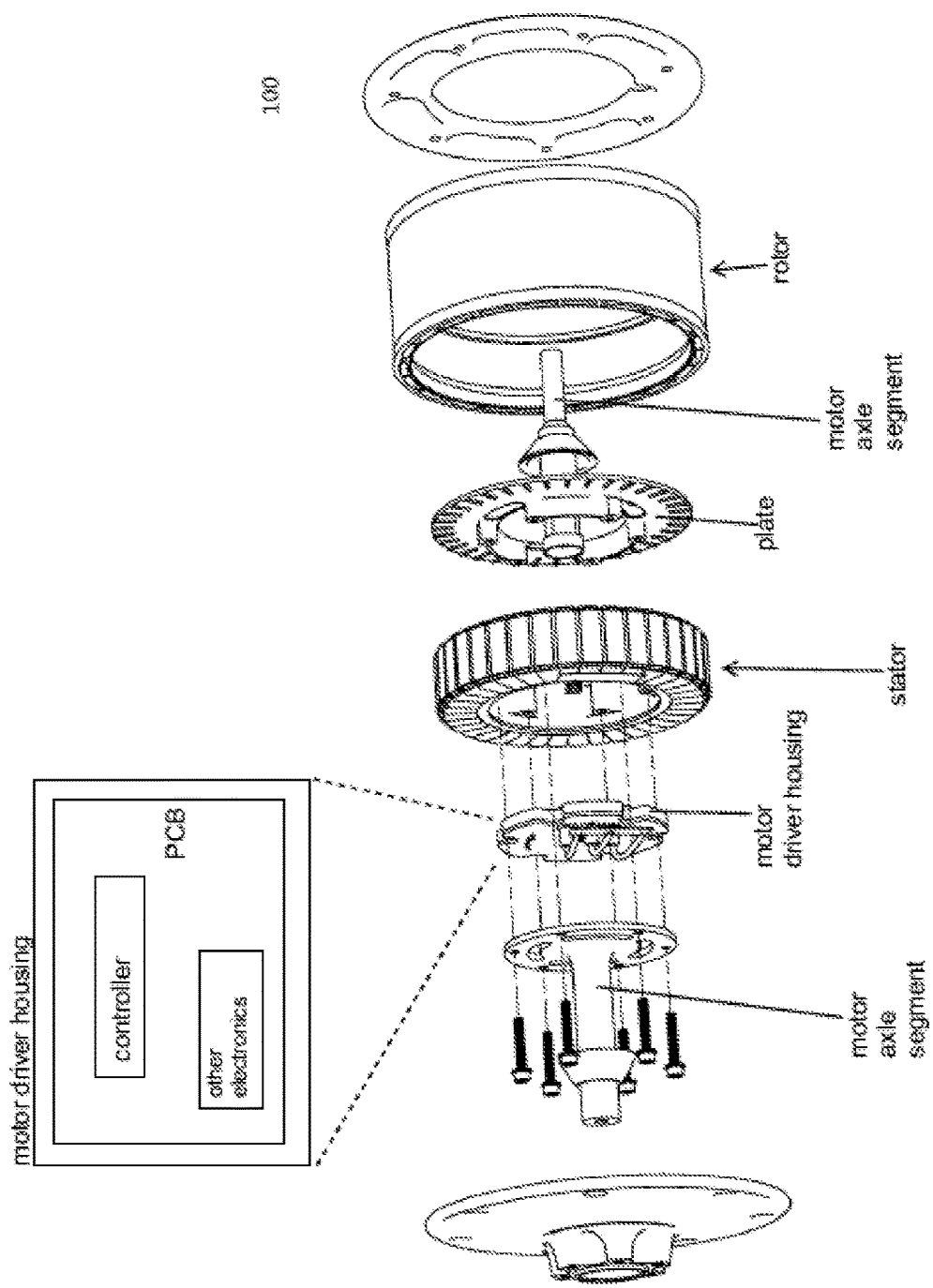

FIG. 12 illustrate a diagram of an example embodiment of a hub for the tire containing an integrated motor, motor driver, and axle of an electric-powered personal transport vehicle. FIG. 13 illustrates an exploded view of the hub for the tire containing an integrated motor, motor driver, and axle shown in FIG. 12.

FIG. 13 illustrates a diagram of an example embodiment of a split-axle outer rotor motor of an electric-powered personal transport vehicle.

Figure 14:
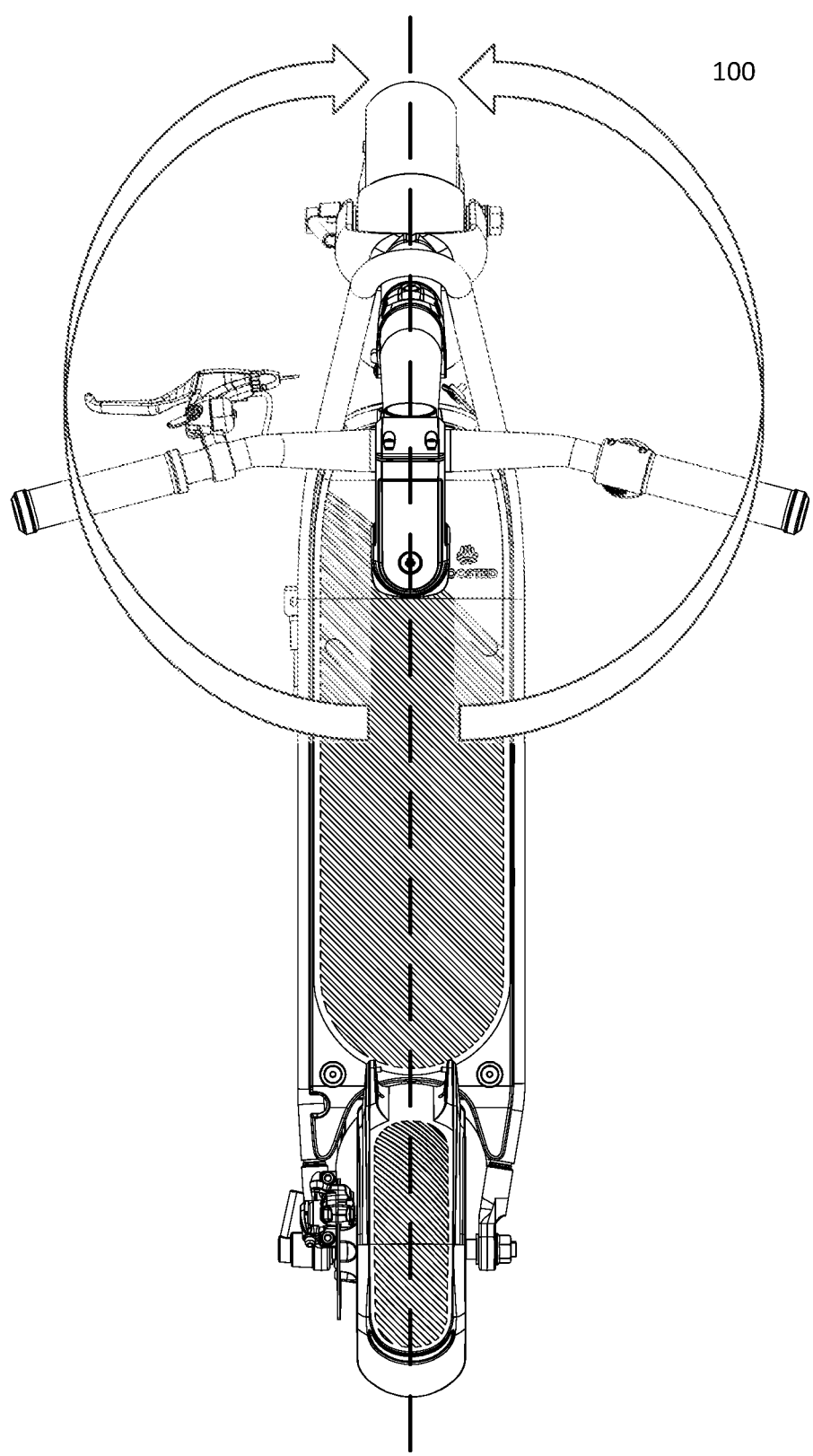

FIG. 14 illustrates a diagram of an example embodiment of an electric-powered personal transport vehicle with a steering-damper system.

These features and more will be discussed in more detail below. While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of wheels in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first electric-powered personal transport vehicle, can be made. However, the specific numeric reference should not be interpreted as a literal sequential order but rather interpreted that the first electric-powered personal transport vehicle is different than a second electric-powered personal transport vehicle. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the design is directed to an electric-powered personal transport vehicle. The electric-powered personal transport vehicle, such as electric powered kick scooter, an electric powered seated scooter, an electric powered bike, an electric powered skateboard and/or an electric powered mopeds has many features and some example features will be discussed below.

For example, the referenced example figures illustrate many features of an embodiment of the electric-powered personal transport vehicle implemented as a scooter. The electric-powered personal transport vehicle, can be powered by one or more electric batteries working in combination with a generator including a stator.

Figure 1:
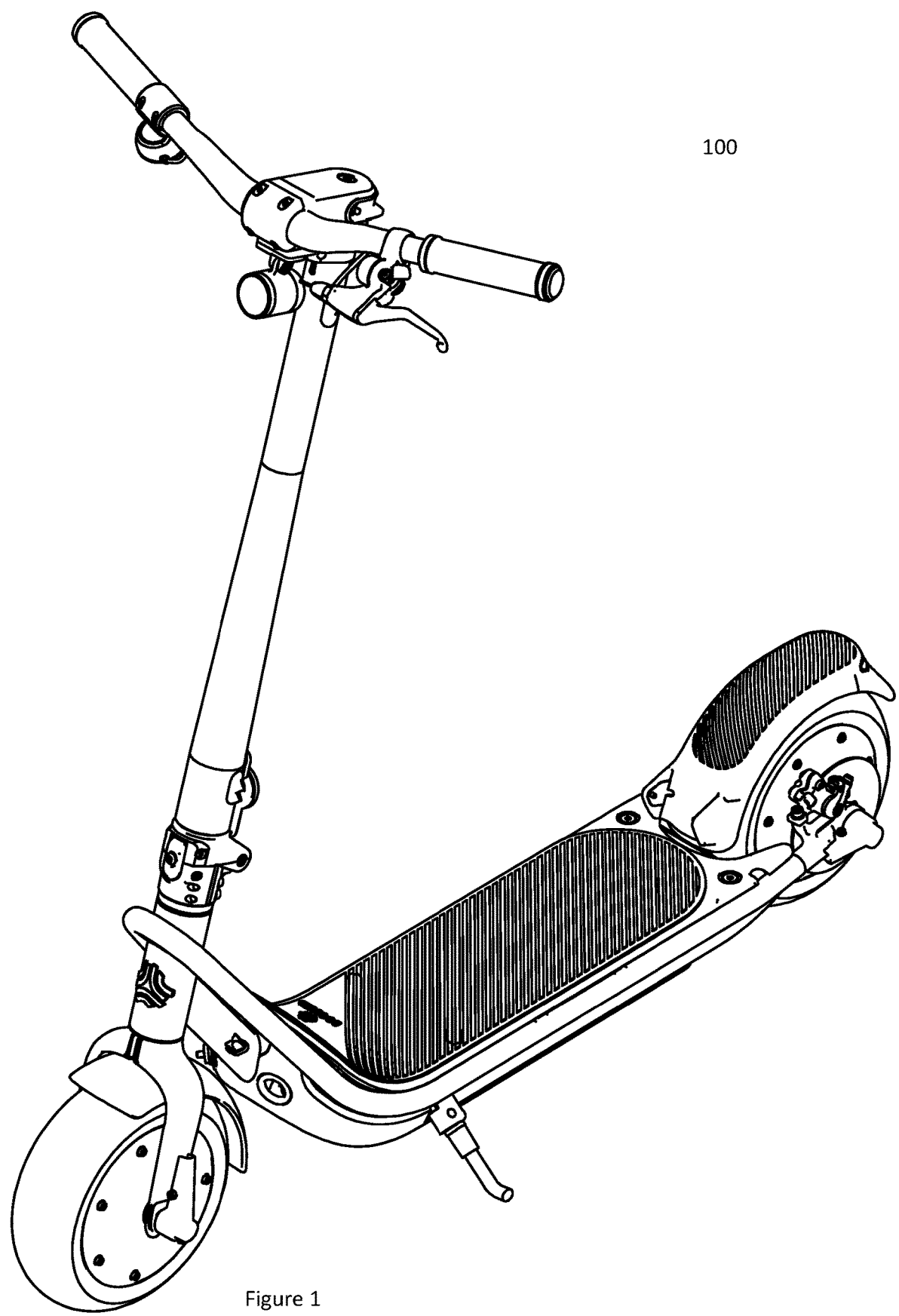
FIG. 1 illustrates a diagram of an example embodiment of an electric-powered personal transport vehicle that includes a deck, one or more wheels and one or more electric motors mounted to a drive truck.

FIG. 1 illustrates an example embodiment of an electric-powered personal transport vehicle 100 that includes a deck, one or more wheels and one or more electric motors mounted to a drive truck. The electric-powered personal transport vehicle 100, such as a scooter illustrated here, may include the deck, one or more wheels, one or more electric motors mounted to a first drive truck of one or more trucks, and one or more batteries. For example, a pair of trucks are mounted to a bottom of the deck, and each truck can include an axle. The one or more batteries power an electric motor, which is configured to drive the wheels by way of a drive system. Each wheel can be driven by its corresponding electric motor. The deck is configured to support a rider's weight while i) standing on the deck or ii) riding on a seat supported by the deck, and operating an electric-powered personal transport vehicle 100. The one or more batteries supply power to the electric motors, electric light or lights, the processors and modules, and other electronic equipment including various sensors. One or more processors and various software routines are configured to control the operation of the electric motor(s), light(s), sensor(s), etc.

Deck

FIG. 1 also illustrates an example embodiment of an electric-powered personal transport vehicle 100 having a deck that can support a weight of a user. The electric-powered personal transport vehicle 100 may have a wide, low deck which can improve stability and rider comfort. The deck may have damping elements between the deck and frame that can prevent vibration from coming up through the deck. The deck can be hinged which can allow quick access inside. The deck may have a storage area under the deck which can allow a repair kit to be carried with the electric-powered personal transport vehicle 100.

The electric-powered personal transport vehicle 100 can have a flexible deck. The top surface of the board is where the rider will stand on while controlling the electric-powered personal transport vehicle 100 and below the surface a spring or other compressible materials can exist to give a little bit of shock absorption to the electric-powered personal transport vehicle 100. A weight of a rider is supported by the deck, frame, and wheels.

The electric-powered personal transport vehicle 100 can have a deck with a seat mounted on the deck for the rider to rest on while driving the electric-powered personal transport vehicle 100.

Throttle

Figure 6:
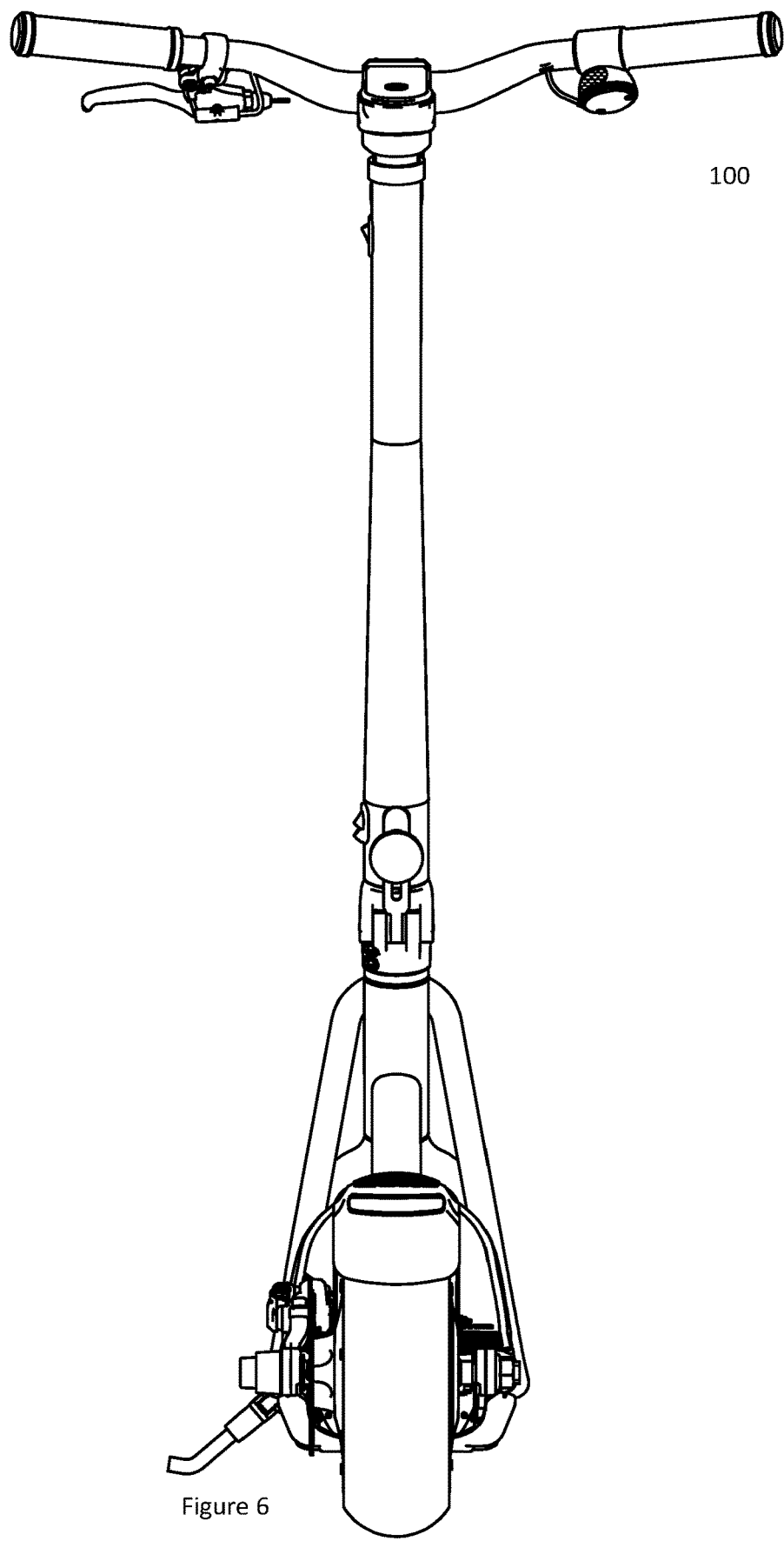
Figure 7:
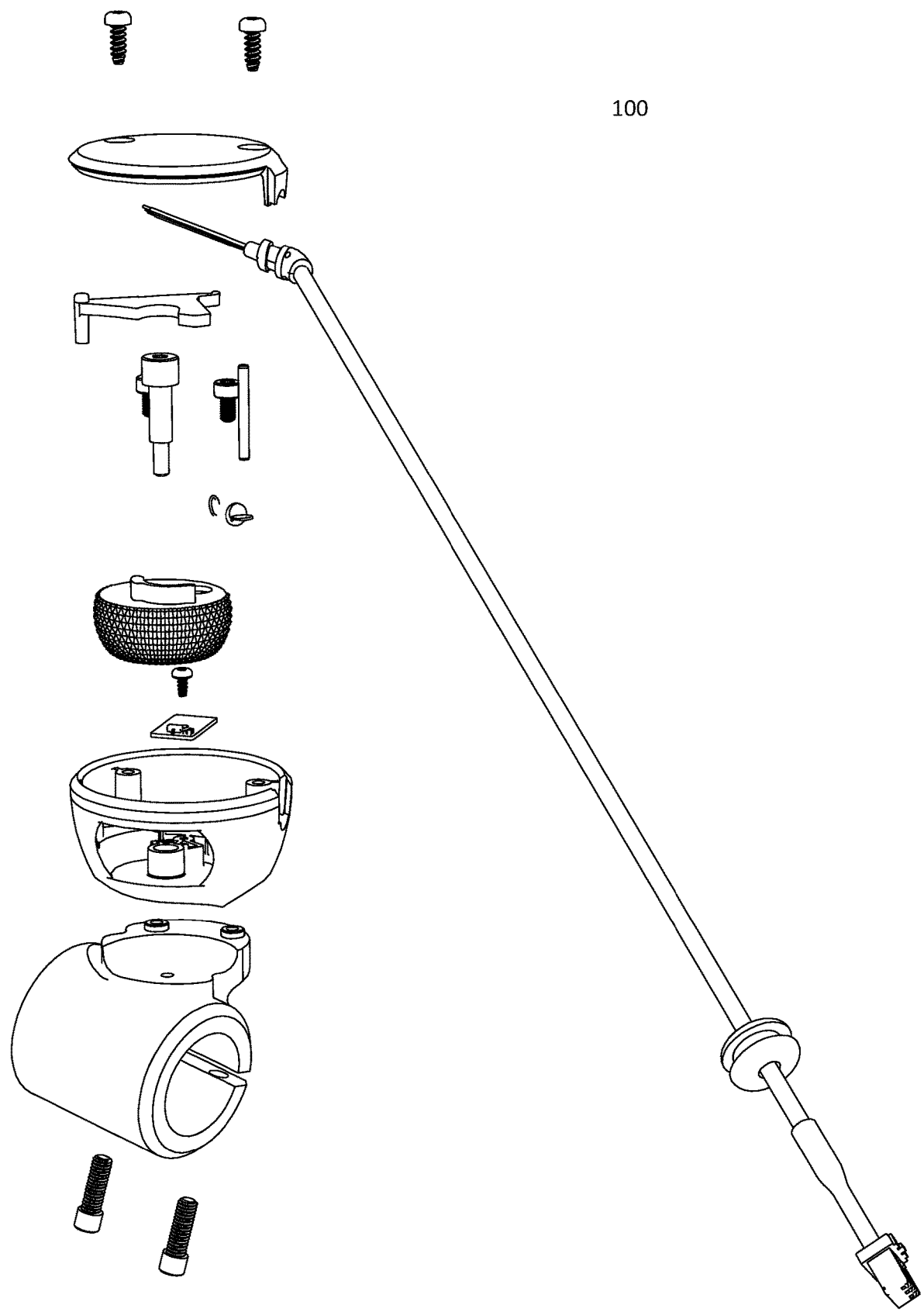

FIGS. 6 and 7 illustrate an example embodiment of an electric-powered personal transport vehicle 100 having a throttle on the handlebar. FIG. 7 is an exploded view of the thumbwheel speed controller in FIG. 6. The electric-powered personal transport vehicle 100 may have a throttle with a thumb wheel speed controller. The throttle on the handlebar can have a bottom cap, a cable, a spring arm, a coil spring retention pin, a coil spring, a throttle wheel with two embedded magnets orientated with opposite polarities and a knurled knob, a logic board with a Hall effect sensor, a housing mount to the handlebar, and securing bolts. The electronic components in the throttle assembly are on the logic board. The logic board has a conformal coating, making it waterproof. Therefore, the entire throttle assembly is waterproof. Also, force-feedback is attained using the coil spring of the spring damper, providing the user more force the more the throttle is moved away from the "neutral" position.

The throttle has a thumb wheel speed controller on a handlebar. The thumbwheel speed controller generally will be physically located underneath the handlebar where the user's hand naturally will grab/fall to when they're standing on the board and have two hands on the steering wheel. The thumbwheel speed controller is physically set up in width and height dimensions to be accommodating for humans with large thumbs to have a full range of control from pushing the thumbwheel to the right to fully brake the electric-powered personal transport vehicle 100 to a stop. Next, pushing the thumb wheel speed controller to the left will speed up the acceleration of the electric-powered personal transport vehicle 100. The user pushes left to speed up the acceleration of electric-powered personal transport vehicle 100 rather than pushing up or down. Therefore, with the orientation of the thumb wheel speed controller being at 90° to the center line, then a bump in the road, forcing the user's thumb to bump up or down does not unintentionally speed up or slow down the electric-powered personal transport vehicle 100. Pushing up on the thumb wheel speed controller does not cause any response to the actual acceleration or deceleration of the electric-powered personal transport vehicle 100. Rather, merely a deliberate push to the left will speed up the electric-powered personal transport vehicle 100 and a deliberate push to the right will slow down the electric-powered personal transport vehicle 100. The thumbwheel speed controller may have two or more actions (left to accelerate, right to brake). In an embodiment, the thumbwheel speed controller can be designed with a small range of motion such that a full move to the left on the thumb wheel speed controller from the right side will put the electric-powered personal transport vehicle 100 into a maximum acceleration allowed by the acceleration control algorithm for that operational mode.

The thumbwheel speed controller may have haptic feedback in order to communicate to the user how much change in acceleration or deceleration that the user is setting through the movement of the wheel to the left or right. The thumbwheel speed controller can have passive force feedback and/or haptic feedback.

The thumbwheel speed controller uses water seals to be able to be rolled right or left and still be waterproof. The thumbwheel speed controller can have a magnetic sensor, versus a light sensor or a potentiometer, to sense the position of the moveable wheel, to allow a physical decoupling of the moveable wheel and the sensor electronics, which allows waterproofing of the electronics. The thumbwheel speed controller can make use of a magnetic sensor of a current position of a thumb wheel for reliability. The thumbwheel speed controller may use the magnetic sensor or other non-contact sensing (moving parts don't have electronics in them, so they are easier to waterproof). The thumb wheel speed controller can use these magnets to detect a current position of the thumb wheel relative to the accelerate input position, the neutral input position, and the brake input position.

The thumbwheel speed controller can have a rough knurled texture that allows a very good grip to the moveable thumb to the thumbwheel speed controller even in very cold weather and when a glove is on the thumb in cold weather. The thumbwheel speed controller can have a knurled wheel to add grip, making maintaining contact with the knurled wheel easier. The thumbwheel speed controller can have a large surface to make it easy to operate with a glove. The thumbwheel speed controller may have a grip surface so it may not slip easily.

The thumbwheel speed controller can have an adjustable horizontal orientation. The thumbwheel speed controller has horizontal manipulation between accelerate, neutral, and brake input positions. The thumbwheel speed controller can have braking and acceleration in a single user input device that enables one-handed operation. The thumbwheel speed controller can be connected to a location to ergonomically allow for natural hand and arm placement while steering with the handlebars.

Again, due to the design of the thumbwheel speed controller, hitting a bump while riding will not result in an unintentional horizontal movement of the thumb. Thus, the electric-powered personal transport vehicle 100 will accelerate or brake only with deliberate horizontal thumb movements/motions by the user. Pressing the thumbwheel speed controller in a vertical direction will not result in an unintentional acceleration or braking. Accordingly, the thumb wheel speed controller has a horizontal manipulation between accelerate, neutral, and brake input positions. The thumb wheel speed controller is configured such that pressing the thumbwheel speed controller in a vertical direction will not result in an unintentional acceleration or braking.

The thumbwheel speed controller can be pressed in to i) change ride modes, ii) implement cruise control, or iii) add other input to the vehicle.

The brake handle can use a non-contact sensor for brake sensing. The brake handle can be designed for as little as two fingers for its operation. Note, the brake lights on the electric-powered personal transport vehicle 100 can be activated by both operation of the brake handle and use of throttle to brake the electric-powered personal transport vehicle 100.

Spring-Damper System for Ride Stability

FIG. 14 illustrates an example embodiment of an electric-powered personal transport vehicle 100 with a steering-damper system. The steer tube may have a steering spring damper. The steering spring damper may have a damping element to prevent handlebar wobble. The steering spring damper can be a return mechanism to cause handlebars to return to center.

Steering Stability

FIG. 14 illustrates an example embodiment of an electric-powered personal transport vehicle's 100 neutral axis. The spring damper assists in providing ride stability. The steer tube has the spring damper. The spring damper is configured to provide a spring force to cause handlebars to return to a center position with respect to a center line of the electric-powered personal transport vehicle 100.

Steering (and/or ride) stability can be the tendency for the steered wheel to restore itself to the neutral position from a steered position without external input. This includes scenarios when the wheel is steered by the rider or features on the road, including bumps and holes. Good steering stability allows the rider to remove one or both hands without losing control of the vehicle. This can increase rider confidence while on the vehicle and enable safe operation such as proper hand signaling. The electric-powered personal transport vehicle 100 controls steering stability through steering geometry.

Steering Geometry

Figure 3:
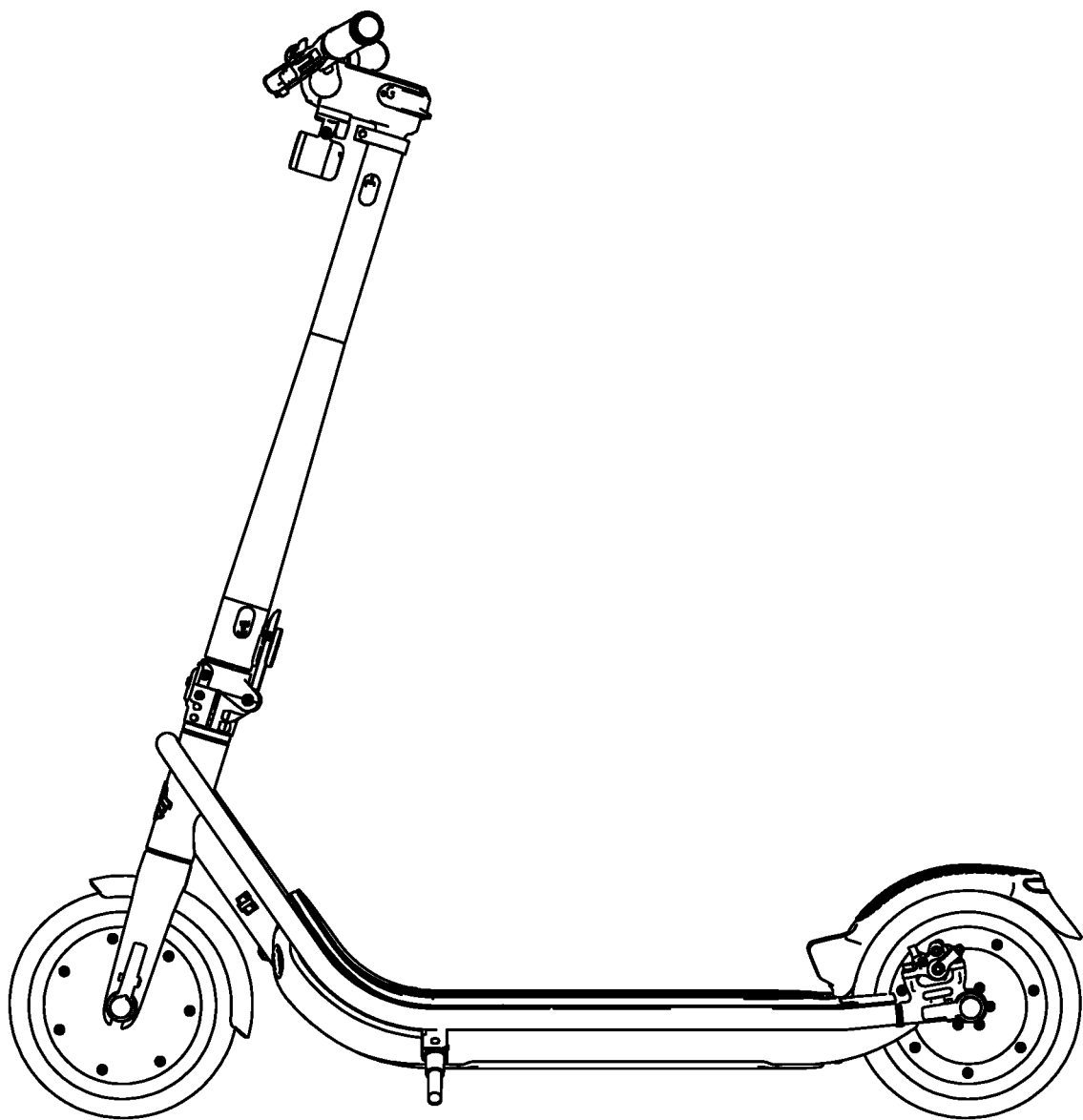
FIGS. 3 and 6 illustrate a diagram of an example embodiment of an electric-powered personal transport vehicle's steering geometry.

FIGS. 3 and 6 illustrate an example embodiment of an electric-powered personal transport vehicle's 100 steering geometry. The electric-powered personal transport vehicle 100 may change three variables to modify the steering geometry: head tube angle, fork offset, and wheel diameter. Adjusting these variables changes how the vehicle handles and responds to rider and road input. These three variables can be used to calculate trail, which is defined as the distance between the point at which the steering axis contacts the ground and the point at which the tire contacts the road surface and the center of the wheel axis. Trail is essential to good steering stability, as it provides a restoring force to bring the wheel back to the neutral position. Generally speaking, the larger the trail the more stable the vehicle. However, excessive trail can lead to negative handling characteristics such as flop and "heavy" steering at lower speeds.

Again, the head tube angle and fork offset cooperate with the wheel center of the small wheel diameter and a point at which the tire makes contact with the surface of the road to provide an initial steering stability for the electric-powered personal transport vehicle 100.

The electric-powered personal transport vehicle 100 may have wide handlebars to improve steering stability. The wide handlebars connect to the steer head tube. The steer head tube may have a steep rake angle to improve stability. The steer head tube's angle connecting to the fork and wheel will naturally cause the steer tube and handlebars to return to a straightforward direction (e.g. see the steer tube angle figure).

The steep angle of descent of the steer tube creates a natural condition for the front wheel of the electric-powered personal transport vehicle 100 to return to the center and drive forward. This steep angle of descent of the steer tube gives a very stable ride. The handlebars can also be swept bars (swept back) to add to the stability.

Due to factors such as user ergonomics and portability that demand small diameter wheels, high head tube angle, and lack of fork offset, traditional kick scooters currently on the market have limited trail, and thus have poor ride stability. These constraints make it virtually impossible to create a steering geometry that enables ideal ride stability by the steering geometry by itself. This reduces user confidence while riding and reduces safe operation of the traditional kick scooter. Traditional kick scooters do not use any additional systems (beyond steering geometry) to improve ride handling.

In order to increase stability beyond where steering geometry alone can get the electric-powered personal transport vehicle 100, the electric-powered personal transport vehicle 100 adds a spring-damper system to the steering mechanism. This spring-damper system acts between the steering column and chassis/frame to restore the wheel to the neutral position, adding to the effects of trail.

This spring-damper system can be hidden within the chassis/frame or be external to the chassis/frame. This spring-damper system can be combined into a single unit or be separate units. The spring-damper system can be integrated into/with the headset. The spring-damper system can be integrated with the handlebar rotation stop.

The spring-damper system works in both steering directions (clockwise and counterclockwise).

The rotary damper prevents handlebar oscillation due to spring and dampens vibrations from the road. The dampers are made to dampen steering vibrations. The torsional spring restores handlebar to neutral position. In an embodiment, the spring damper also gives a counterforce to the turning up the handlebars and fork so that the further that the handlebars are turned to the left or right, the stronger the force of the spring resisting that turn. The dampers and spring combine to improve ride stability on the electric-powered personal transport vehicle 100.

Overall, the spring-damper system allows steering to smoothly return to the straight-ahead direction. The spring/damper system smoothly restores steering to the "straight" position, along the neutral axis. The spring-damper system cooperating with the steer head tube to wheel geometry allows for effortless steering and unparalleled control, to the point that users can ride "no-handed" if desired.

The spring-damper system cooperating with the steer head tube to wheel geometry increases control to allow the user to more comfortably implement common bicycle hand-signals for proper road navigation or perform more mundane operations such as scratching an itch or adjusting their helmet.

The electric-powered personal transport vehicle 100 optimizes steering geometry to attain a decent ride stability, and then assists the steering geometry with the dampers and spring to achieve the desired outcome/level of steering stability.

The tires may be a tubeless tire. The tubeless tires can allow for an offset valve. Seals can be added to the split rim to allow for a tubeless tire.

Two Piece Rim/Split Rim

FIGS. 9A-9C illustrate an example embodiment of a multiple piece split rim of an electric-powered personal transport vehicle 100. FIG. 9A shows the oval tire in the middle of the two pieces making up the split rim. FIG. 9B shows the two pieces making up the split rim with the tire installed. FIG. 9C shows a side perspective of the two pieces making up the split rim with the tire installed. The electric-powered personal transport vehicle 100 may have a two-piece rim/split rim to enable reasonably easy tire change (e.g. see the Split rim in the figure). The split rim can serve to both improve the tire/tube repair experience as well as increase the torque of the motors and thus performance of the vehicle.

The multiple piece split rim contains a motor within a hub. The motor, in an outer diameter of the split rim, can either i) extend flush across its surface with the respect to an inner portion of a tire attached to the split rim or ii) extend its surface into an air space in the inner portion of the tire. Note, removing a depression typically found in the outer diameter of other rims allows for a larger motor for a same wheel diameter.

One of the key characteristics of a scooter motor that determines how much force it can exert to propel the vehicle forward is the ratio of stator diameter to the diameter of the tire. The smaller this ratio can be the greater that force can be. The split rim can fit a larger motor within the hub because a depression that is typically present in the rim to allow the tire to offset while changing. The depression in a typical rim to tire relationship is no longer required. (e.g. see the extra space in the rim for a larger motor in the figure) The motor in the outer diameter of the rim can either extend flush across its surface with the respect to the inner tire or extend its surface into the air space in the inner tire (e.g. see the motor into the interior of the tire figure and motor extending flush with or into an interior of a tire figure). The split rim can provide more torque to a wheel with a motor compared to a standard rim because removing the rim depression allows for a larger diameter stator at the same wheel diameter. A single split rim wheel assembly with a pneumatic tire allows an enlarged stator size. A double split rim with a tubeless tire actually accommodates an even larger stator that creates even more torque for the same wheel diameter. The split rim increases the torque output of the motors utilized for a given tire diameter compared to a standard rim.

Next, a safety problem could present with a split rim design because a user could try to remove the rim while the tire is pressurized. To solve this issue, a slotted path for a screw to have to fit through can prevent a user from being able to take the rim off without the tire being inflated (e.g. see the rim and subsequent tire removal figure). Basically, this provision makes it so a user can't remove the rim while the tire is inflated.

To remove the tire, one first deflates the inner tube. When the inner tube is flat, a user removes all of the rims retaining screws. With all of the retaining screws removed the tires slides straight off without any tedious prying or specialty tools. Further, the retaining screws are designed in such a way as to limit dangerous blow out in the case the tire is still inflated. They do this by being long enough to keep the ring from coming off prior to the tube slipping over the motor edge and popping. The split rim may use a separate, removable ring to hold the tire onto the motor/wheel. The ring mechanically locks in the ring to the motor with one or more retaining screws. The split rim reduces the pain of repairing the tires and/or tubes of a wheel of an electric-powered personal transport vehicle 100. The split rim makes it easier to replace and repair tires without the need for specialty tools such as a tire iron.

The air in the tire may be filled with a number of mechanisms. For example, see the axle and fill tube figure. Alternative mechanisms that allow air into the tire while allowing reasonably easy tire removal from the rim can include a needle valve, a valve with an angled stem, an internal air channel in the rim with a screw in valve, etc. The tires can have a needle valve that allows you to not worry about making room for a stem. The screw in valve could be mounted into the motor casting to allow use of a traditional valve.

The electric-powered personal transport vehicle 100 may have dual removable rim clamps and a tubeless tire combined with needle valve filling design. A thick piece of rubber may be put on along a central section of the hub to allow the tire to be able to run flat/with diminished or no air. The rims may have dual removable rims to allow for clamping of the tire beads so that you don't need a tube and can run low pressure (tire is effectively sealed by clamping bead on both sides). Thus, the tires may be a tubeless tire. The tubeless tires can allow for an offset valve. Seals can be added to the split rim to allow for a tubeless tire.

Electric scooters and other lightweight vehicles use small diameter wheels that make tire removal very difficult for users and anyone without the tools typically only found at factories or specialist repair shops. The difference to larger bicycle wheels is that the relation between the tire height and tire's inner diameter makes it very difficult to stretch the tire over the rim bead. The main reason to remove the tires is to repair flats or to replace worn tires.

The split rim may be used with two types of wheels, i) a wheel with a split rim and hub motor version, and ii) a wheel with a split rim and spoked rim version.

The wheel with a split rim and hub motor can be as follows. The rim of the hub motor wheel has two ridges called "beads" on both edges of the wheel. The tire is held in place between these beads. The split rim has a portion of the hub motor wheel with one of the sides that has a removable plate or a ring that when fixed in position makes up the bead on one side. When the bead plate is removed, tire removal is very easy. It is beneficial that only this external bead plate is removed for tire service but the rest of the motor enclosure remains intact to prevent debris, moisture and damage to the motor.

The wheel with a split rim and a spoked rim can be as follows. Same as above but the removable bead plate is attached to a spoked rim rather than to the enclosure containing the hub motor.

Power System

Figure 8:
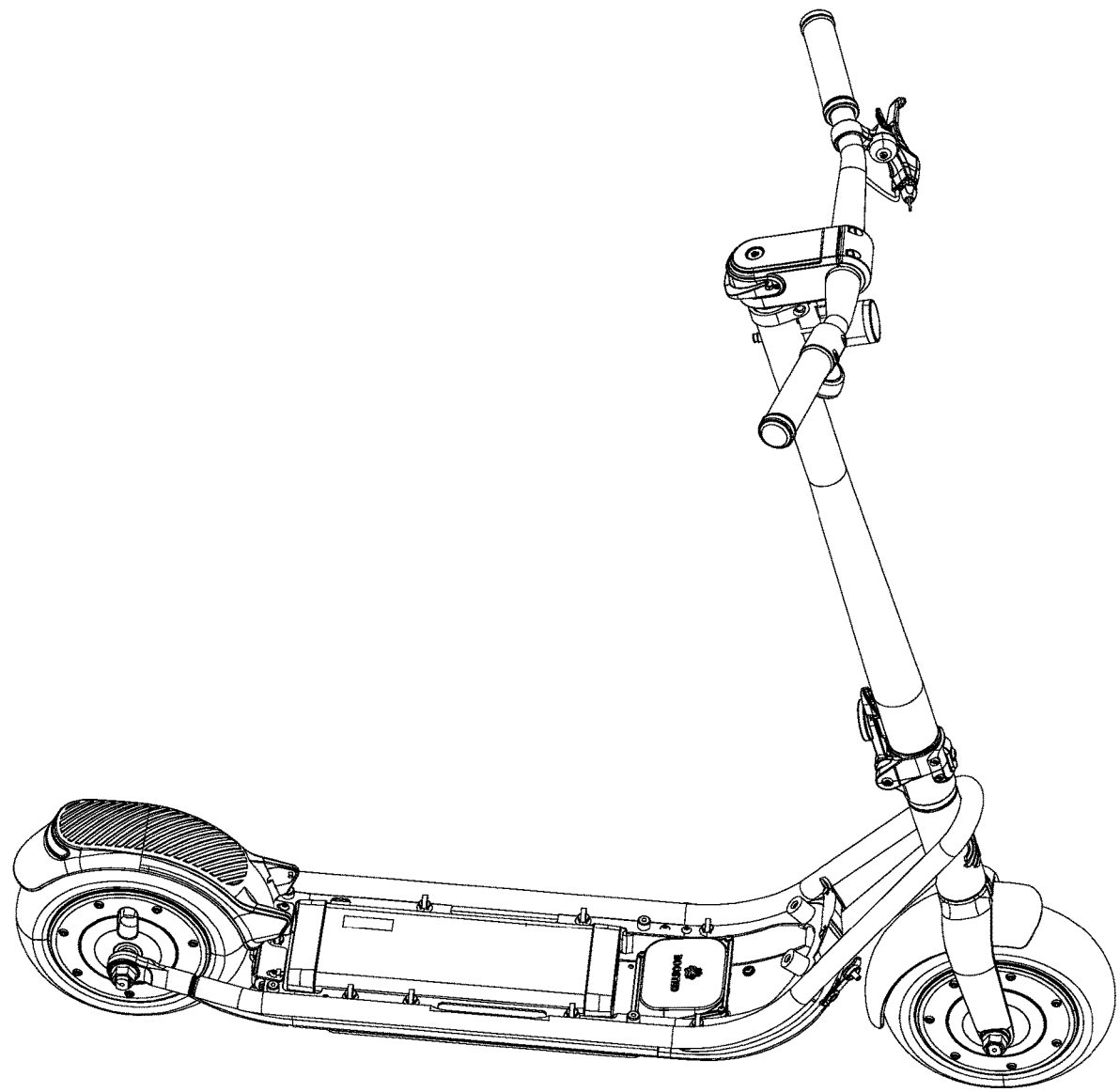
FIG. 8 illustrates a diagram of an example embodiment of a power system of an electric-powered personal transport vehicle.

FIG. 8 illustrates an example embodiment of a power system of an electric-powered personal transport vehicle 100. One or more batteries within one or more enclosures eventually mount to or within the deck. The one or more batteries supply power to the electric motor or motors, electric light or lights, and other electronic equipment including various sensors. One or more processors and various software routines are configured to control the operation of the electric motor(s), light(s), sensor(s), etc. The electric-powered personal transport vehicle 100 may have a battery with an anti-propagation design. The main batteries may use thermal insulating wraps combined with thermally conductive heat distribution elements to prevent a thermal failure of a single cell from propagating to other cells in a battery pack. This improves pack safety. Thus, the battery pack may use insulating wrappers to prevent propagation of a thermal fault from one cell to another cell. The thermal insulating material in the wrapper provides for safety via being either a heatsink or insulation in order to prevent a catastrophic failure of one battery cell to another cell.

The batteries may use a construction that densely packs battery cells together. Power density (W/kg) can indicate how much power a battery can deliver on demand.

A battery pack contains a set of battery cells with a power density to supply at least a 700 watt continuous motor in each wheel, such as 750 watts per wheel, and a peak power value of at least 1500 watts, such as 2000 watts. The heat dissipation controller is configured to rely on battery power capability to dictate what amount of power is to be routed to the motors and to the frame. The heat dissipation controller is coupled to one or more temperature sensors to determine a temperature of one or more of the battery cells and a sensor to determine a charge level of a given battery cell. The heat dissipation controller is configured to determine the power distribution between the battery cells and the frame when braking to ensure no battery cell exceeds a temperature limit and a charge limit for that battery cell by heat dissipation of the excess power into the frame of the electric-powered personal transport vehicle 100 via the heat dissipation mechanism. FIG. 11 illustrates a diagram of an example embodiment of the heat dissipation controller determining the power distribution between the battery cells and the frame when braking to ensure no battery cell exceeds a temperature limit and a charge limit for that battery cell by heat dissipation of the excess power into the frame of the electric-powered personal transport vehicle 100 via the heat dissipation mechanism.

The electric-powered personal transport vehicle 100 may have an integrated EV power system. The integrated EV power system can have intercommunication on a common bus and may configure between components to allow them to act as a system.

The electric-powered personal transport vehicle 100 may have the ability to charge the system quickly. The battery and system cabling can be constructed to accept high rates of electrical current; and thus, suck in energy quickly for the battery and not overheat for the cabling. The battery can have some design features such as more cells, cells are under charged, the cells and the power system having components with larger current carrying ratings, the battery is monitored to ensure the battery during charge and operation does not go in danger zones outside a set of parameters for safe operation.

Motor Heat into the Frame

FIG. 10 illustrates a block diagram of an example embodiment of a heat and energy transference throughout an electric-powered personal transport vehicle 100.

The electric-powered personal transport vehicle 100 may use a regenerative braking system for the one or more wheels driven by the one or more electric motors in place of or in addition to a mechanical braking system. A heat dissipation controller for the regenerative brakes has a braking power management algorithm that factors in a throttle command input, vehicle battery state, and motor control in order to determine power distribution, when braking, between i) the electric motors to drive the wheels, ii) the battery's charge state and charge rate, and iii) a heat dissipation of excess power into a frame of the electric-powered personal transport vehicle 100 via a heat dissipation mechanism.

When a rider of the electric-powered personal transport vehicle 100 wants to slow down, the vehicle's energy must be converted from kinetic energy (speed) to another form. The regenerative braking converts energy into charge in the battery pack, but this is only possible when the battery is not fully charged and/or when the charging rates are not being exceeded. However, excess energy can be dissipated via a resistive heat dump into the chassis/frame via a heat dissipation mechanism. A hardware module containing a heat dissipation controller determines an amount of energy/power needed to be dissipated to integrate the energy balancing with other power sources (e.g. motors and batteries). The resistive heat dump into the chassis/frame via a heat dissipation mechanism allows the electric-powered personal transport vehicle 100 to take advantage of dense battery technology to significantly improve energy storage (and thereby electric-powered personal transport vehicle 100 range) without sacrificing electric (regenerative) braking capabilities.

The resistive heat dump into the chassis/frame via a heat dissipation mechanism converts the vehicle's energy into heat in two steps:

i) The vehicle's electric motors convert kinetic energy from braking the electric-powered personal transport vehicle 100 into electrical current.

ii) The resistive heat dump into the chassis/frame via a heat dissipation mechanism converts electrical current into heat, which is dissipated into the frame or airflow.

The heat generated by the electric motor can take advantage of the frame to dissipate heat. The electric-powered personal transport vehicle 100 may use electric breaking via heat dumping into the chassis frame, into a larger axle, and/or any combination of the two. The heat generated by the electric motor can be used to be dumped into the chassis to dissipate the heat as well as potentially route heat to other portions of the electric-powered personal transport vehicle 100 such as the handlebars and its grips to stay warm during cold weather. The heat generated by the electric motor can also be used to warm the battery pack, which allows greater regen current. Dissipating the heat generated by the electric motor can allow endless regenerative braking. The resistive heat dump into the chassis/frame via a heat dissipation mechanism dissipates excess braking energy from braking the electric-powered personal transport vehicle 100 as heat into the vehicle's metal chassis and/or airflow during riding.

The resistive heat dump into the chassis/frame via a heat dissipation mechanism allows for braking downhill on a full battery without causing overcharge or loss of the brakes. Also, removing heat from various electrical components in the system can assist the brakes to working longer and better. Also, putting heat from the brakes into the battery can allow the battery absorb more energy and more power. The electrical energy generated through regenerative braking can be dissipated.

Controlling the heat generated by the electric motor and dissipated out can allow greater travel distance range for the electric-powered personal transport vehicle 100 with the same capacity of battery.

The electric-powered personal transport vehicle 100 may use a number of power storage and heat dissipation mechanisms. The electric-powered personal transport vehicle 100 may use different types of heaters: PCBA, kapton, aluminum extrusion rod. A custom extrusion that's meant to contain a heater "core" could make installation easier. The specific example here is a heater element to dissipate energy, but we could use supercaps to store excess energy, phase change materials, etc.

The electric-powered personal transport vehicle 100 uses a braking power management algorithm that prevents battery damage while accounting for many other factors. The control circuits use a control methodology to efficiently tune heat dumping in components. The control system and power management architecture manages that energy generation and dissipation. The braking power management algorithm factors at least rider input (throttle command) and vehicle battery state (battery charge level, etc.) and motor control in order to determine power distribution between i) motors to drive the wheels, ii) batteries charge state and rate, and iii) heat dissipation mechanism. The throttle input can be scaled and mapped (non-linear) to produce a desired motor power command. The motor power command is scaled relative to present battery capabilities and heat dissipation capabilities such that a user's full throttle command would fully utilize that capacity. One or more heat dissipation controllers for the heat dissipation mechanism to dissipate the desired power. In addition, these heat dissipation controllers constantly estimate power dissipation capability. The error between required and actual heat dissipation power dissipation is used as an input to the heat dissipation controller(s) to drive the output to the required value. Motor output can be limited by the actual power dissipation.

The electric-powered personal transport vehicle 100 may visually show regenerative braking effects. The regenerative braking effects can be shown with LEDs and/or display; and thus, how much energy/power is being captured and/or heat being dumped.

In an embodiment, the heater can be implemented as a Cartridge Heater in the frame/chassis. Dual cartridge heaters can be mounted in the electric-powered personal transport vehicle's 100 chassis to dissipate, for example, up to 1200 Watts of peak braking power into the frame.

Airflow cooling can be used to cool the cartridge heaters and other portions of the frame receiving the heat. The cartridge heaters can be cooled by forcing airflow past the cartridge heaters. Forced-air cooling augments the heat dissipated into the chassis and prevents chassis overheating.

Another heater may be a Finned Nichrome/Ceramic Heater built into the frame. Some of the components of Nichrome/Ceramic Heater can be as follows. The heater can be composed of nichrome wire embedded in ceramic. The wire and ceramic are sealed in a finned aluminum extrusion, which increases the heat transfer to airflow during riding.

Another heater may be a flexible or rigid PCB that is directly coupled to the electric-powered personal transport vehicle's 100 chassis. Another heater may be a ring heater mounted in place of a rear disc brake or as part of the rear disc brake.

The resistive heat dump into the chassis/frame via a heat dissipation mechanism allows this electric-powered personal transport vehicle 100 to use battery packs that are more energy dense; thereby, giving the electric-powered personal transport vehicle 100 more range for less battery pack cost/weight/volume, while not sacrificing a regenerative braking capability. Note, in some cases, when the battery cells are very energy dense, then these battery cells are generally unable to safely accept significant power generated by regenerative braking. However, the resistive heat dump into the chassis/frame via a heat dissipation mechanism allows regenerative braking capability and dense battery technology.

The resistive heat dump into the chassis/frame via a heat dissipation mechanism uses a hardware module for its control to deal with excess braking energy from the electric-powered personal transport vehicle 100 using regenerative braking. Prior techniques a) rely mainly on mechanical braking mechanisms and b) the typical focus on regenerative braking is the ability to reclaim energy by charging up the battery without any discussion on limits on charge rate of those batteries or what happens on over charging the capacity of their non-dense battery cells. The hardware module containing the heat dissipation controller provides a mechanism to dissipate power generated by regenerative braking when all or a portion of that energy cannot be accepted by the battery system made up of densely packed battery cells. The hardware module monitors and factors in the current battery state plus the motor control powertrains to determine an amount of heat to dissipate in the electric-powered personal transport vehicle 100. The hardware module containing the heat dissipation controller provides a control system which manages power distribution more tightly in the powertrain, with more data flow between components, rather than designing so that motor power (both output and regenerative input) is always within acceptable ranges for the battery system, in any operating condition. The hardware module containing the heat dissipation controller has control system blocks outlining how to integrate the power dissipating process into a control scheme that otherwise relies on battery power capabilities to dictate what power can be routed to/from the motors.

Integrated Motor and Motor Driver

FIG. 12 illustrate a diagram of an example embodiment of a hub for the tire containing an integrated motor, motor driver, and axle of an electric-powered personal transport vehicle 100. FIG. 13 illustrates an exploded view of the hub for the tire containing an integrated motor, motor driver, and axle shown in FIG. 12. Each motor can have a motor driver housing. The motor driver housing can use a slanted seal to prevent having to use multiple seals during manufacturing. The motor driver may be integrated into the hub motor. The motor electronics are well protected inside the motor driver housing. The integration of the motor driver into the hub motor can improve efficiency due to high current wiring path between motor driver and motor being shorter.

The motor driver housing contains a printed circuit board with its controller and other electronic components, and is mounted inside of the motor stator. Note, a motor driver typically requires a separate sealed module from the motor stator. A hollow axle allows the motor cable to pass through the sealed housing.

The integrated motor and motor driver may have a housing cover, the motor driver mount and heat sink, the motor driver printed circuit board, the stator of the motor, the rotational portion of the motor, a motor housing, and motor housing ring. The integrated motor and motor driver do not have separate modules for motor and motor driver. The motor may be a brushless outer-rotor motors. In an embodiment, the motor driver is installed in inside of the brushless outer-rotor motor.

The integrated motor and motor driver can use the hollow axle and motor stator as a heat sink for heat coming from the motor driver's printed circuit board. By coupling the motor driver into the motor stator, the motor driver now accesses a large thermal mass of the hollow axle and motor stator to sink heat out of the motor driver board.

The integration of the motor driver into the hub motor allows simplification of cable routing throughout the electric-powered personal transport vehicle 100 because mainly wired connections now route between the throttle, the motor itself with its integrated motor driver, and the battery. The integration of the motor driver into the hub motor reduces copper losses because of the use of shorter cable runs. There are also fewer connectors used between various runs of cables; thus, slightly improving waterproofing of the electric-powered personal transport vehicle 100 as well.

The integrated motor and motor driver reduces cost, complexity, and weight (achieved by removing a sealed enclosure from the vehicle). The integrated motor and motor driver reduce complexity of manufacturing the electric-powered personal transport vehicle 100 in several ways, including reduced amounts of connectors needed, reduced cable lengths, etc. Integrating the motor driver eliminates the need for a separate, waterproofed, motor driver enclosure. The motor stator and hollow axle can provide excellent heat sinking for the motor driver, allowing higher torque operation.

Split-Axle Outer Rotor Motor

FIG. 13 illustrates an example embodiment of a split-axle outer rotor motor of an electric-powered personal transport vehicle 100. The motor axle can be split crosswise into multiple axle segments. Each segment can be fastened directly to the motor stator. In a two segment example, each half of the axle can include a plate to clamp onto the stator and sink heat out of the stator windings of the motor stator. The plate can contain ribs to better fit the contour of the windings. The motor stator can have a "floating" design with reduced weight compared to a "spoked" design that keys onto a through-axle.

The split-axle is split in two or more pieces. The split-axle coupled to other parts of the outer rotor motor can generally be hollow. The split-axle can be a two part aluminum axle. The split-axle can be a two part axle where the aluminum axle is in direct contact with the windings of the stator of the motor.

A first split-axle segment can mount a motor driver or other electronics. A second split-axle segment can clamp on stator windings and cool the stator during operation. The split-axle is in direct contact with the windings of the stator of the motor. The split-axle segments couple to the lightweight motor stator.

The second split-axle segment couples to cone washers. The split axle utilizes careful transfer of axial loads with the cone washers to allow for hollow aluminum axles. The split-axle uses cone washers and aluminum to make the axle strong enough for safe and long term use. The cone-washers set the bearing preload and allow a low-stress axle design.

The split axle includes a plate to sink heat from motor stator. The split-axle also provides space for a motor driver to be placed internal to the motor. The split-axle can provide more space inside of the motor housing in order to mount electronics within the motor, such as a motor driver.

The split axle design includes several features for weight reduction. The split-axle can have a reduced weight compared to a solid axle. The split axle design can remove unnecessary steel to make the outer rotor motor assembly less heavy. The split axle design can use structural material merely where needed. The steel structural material in typical assemblies is replaced by lightweight aluminum.

The split-axle has a higher performance to weight ratio than other comparable motors. The construction of the split-axle removes non-essential material from areas where they are not contributing to motor performance and shifting the materials to areas where they can help pull heat from the motor and thus increase performance. In part, the split-axle does this by allowing for a direct cooling path of the winding of the stator to the outside of the motor housing. The split-axle can provide superior heat-sinking of the stator windings to allow a higher torque density. The split-axle may be made larger in diameter to be able to further facilitate heat transfer out of the motor. The split-axle may be used with a water/fluid cooling system.

The split-axle can provide a lower weight and a greater cooling of the stator for a brushless outer rotor motor in the electric-powered personal transport vehicle 100. These two features in combination lead to higher performance in the motor.

As discussed, the motor may dump heat into the chassis to significantly improve the braking of the electric-powered personal transport vehicle 100. The motor may use the axle and other metal components to transfer its internal heat to the chassis. Also, the motor may be located in the hub of the rim.

The motor system can also have a fluid coupling between the center of the motor and the outside surface to remove heat from the motor. Adding a fluid inside the motor can improve heat transfer from the hot stator components to the outside moving parts such as the motor outside surface castings.

The motor can be an ultra-light motor system. The ultra-light motor system can have a gear or belt reduction to improve power density. The ultra-light motor system can have a dual drive motor system.

The motor cable exiting the motor axle can have a boot that is 90 degrees from the axle axis. This allows the cable to come out along the fork or frame instead of jutting out.

The motor system can have an idler pulley to allow greater wrap angle on the belt system.

Axle

Again, FIG. 13 illustrates an example embodiment of an electric-powered personal transport vehicle 100 having an axle. The electric-powered personal transport vehicle 100 may have reinforced dropouts for the axles and wheels. High motor torque in forward and reverse directions can put extreme loads on dropouts, so reinforcement is a key feature. The reinforced dropouts may have steel inserts in front and rear dropouts prevent wear.

The motor system can have a hollow motor axle. The hollow motor axle can be a larger diameter to allow for easier cable routing and better torque transfer. The hollow axle allows cables from that motor to pass through a sealed housing of its corresponding motor driver housing. The larger motor axle diameter could also improve the strength to weight ratio. The hollow motor axle can have water cooling tubing routed through it to improve cooling and efficiency.

A larger motor axle can allow a user to connect to the chassis with fewer parts. The larger motor axle could allow for an electrical connector to be built directly into the motor interface. Again, the integrated motor and motor driver are configured to use the hollow axle and the motor stator as a heat sink for heat coming from the motor driver's printed circuit board.

The motor can cooperate with an axle made of aluminum. An aluminum axle could be used to transfer heat out of the motor and into the chassis and outside surface of the motors.

Motor Control

The electric-powered personal transport vehicle 100 starting and stopping power supplied to the motor can be optimized. The optimization extends to its battery to support the corresponding spikes of electrical current from the battery during an initial starting and any rapid braking. The improved dynamic range of batteries can be achieved via a battery controller and use of the regenerative braking. The motor driver integrated within the motor can contain one or more controllers that execute a number of algorithms and other control functions. A first algorithm may be tuned specifically for, for example, a three pound main battery to move a 180 pound rider on the board with a smooth acceleration and deceleration. Large peaks in current and voltage may temporarily exceed manufacturer stated limits of a cell in the battery, but control algorithms designed into the motor and battery control systems may make this a safe and acceptable action. Timing of power spikes, control of battery temperature, and selective routing of electrical energy to other components in the electric-powered personal transport vehicle 100 all may be used to improve the overall acceleration and braking experience while allowing the battery to operate safely. A voltage or current mode control and control algorithm may be used to modulate electrical current spikes to get peak performance.

The controller may dynamically control power supplied to the electric motor(s) for the electric-powered personal transport vehicle 100. The controller may determine one or more user parameters via sensors, a user input value from a rider, and a combination of both. The controller may select a first electrical current output value based on the user input value and/or sensors from an input map. The controller may control power provisioned to the electric motor(s) to maintain an output current within a predetermined range of the first current output value. The controller may via one or more sensors detect a condition indicative of perturbation. The controller may then select a second electrical current output value for the first user input value based on the user parameter(s). The controller may in response to detecting the condition indicative of perturbation, controlling power provision to the electric motor to maintain the output current within a second predetermined range of the second current output value. The controller may then incrementally adjust an electrical current output value mapped to the first user input value from the second current output value to the first current output value. The controller will control power provisioning to the electric motor to maintain the output electrical current within a predetermined range of each adjusted current output value.

A set of electrical current sensors may be installed on the motor or in the motor control circuit. The controller may use the different sensors to determine electrical current in different scenarios to save power output from the battery and be more efficient or to enhance control of the motor. A scheme may be used where two current sensors are leveraged to sense all three phase currents in a three phase electrical motor using a ground referenced sensing scheme. This scheme may prevent sensor noise and reduce overall system cost.

Wrap Tube

Figure 2:
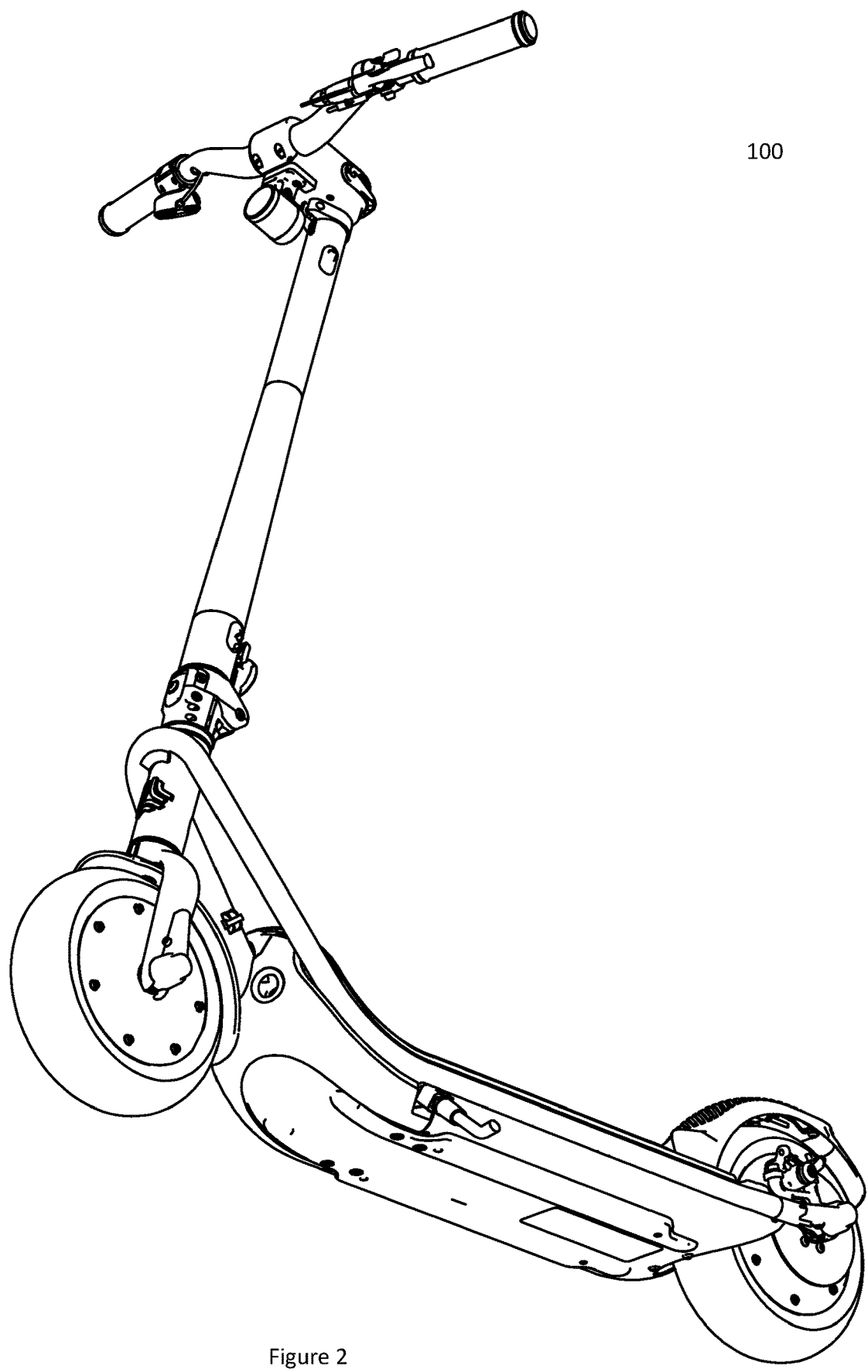
FIG. 2 illustrates a diagram of an example embodiment of an electric-powered personal transport vehicle having a wrap tube.

FIG. 2 illustrates an example embodiment of an electric-powered personal transport vehicle 100 having a wrap tube. The electric-powered personal transport vehicle 100 may have a wrap tube (e.g. see the side view figure). The frame of the electric-powered personal transport vehicle 100 can have the wrap tube, which can be a closed metal loop around the electric-powered personal transport vehicle 100. The wrap tube can be used as a component to allow easy locking of the electric-powered personal transport vehicle 100. The electric-powered personal transport vehicle 100 can have one or more mechanisms to lock to the wrap tube.

The electric-powered personal transport vehicle 100 may have a basket mounting to wrap tube. The wrap tube can have threadable connections to be connected to a basket, which prevents the basket from turning when you turn the handlebars (e.g. see the basket extension from the deck figure).

The frame design may include a wrap around the tube of the frame and reflective paint on the wrap around the tube.

The wrap tube can enable a lightweight frame architecture.

Waterproofing Methodology

FIG. 8 illustrates an example embodiment of a motor driver of an electric-powered personal transport vehicle 100 having waterproofing technology. The electric-powered personal transport vehicle 100 may consist of individually sealed components with environmentally an open chassis. For example, individually sealed electronic modules include at least a sealed battery and a sealed motor driver. The electric-powered personal transport vehicle 100 chassis has intentional water drainage holes at various locations in the chassis including locations in the front and the back of the electric-powered personal transport vehicle 100. The modules containing electronic board and components are sealed with a sealant. For example, the front motor module and the rear motor module are sealed. The motor driver module is sealed. The battery module and the display are sealed. Each critical module is individually waterproofed. In this example, the Motor driver, motors, battery, and display of the electric-powered personal transport vehicle 100 are each individually and separately protected from water ingress. The cables and connectors on the electric-powered personal transport vehicle 100 are also sealed individually. In an example, gaskets, grommets, and or O-rings, such as a VHB gasket, and a sealant, such as potting, can be used to achieve consistent seals on the Motor Driver module.

When the entire compartment of a combine module are lightly sealed against water, and this main seal fails, all electronics inside the compartment are compromised. Waterproofing of individual modules protects key electronics in the event of a single module's seal failure, saving repair cost. This modular sealing also allows for a higher grade of waterproofing than typically achieved, allowing users to ride in wet conditions without risking a short circuit. High standards for waterproofing the electric-powered personal transport vehicle 100 gives users the freedom to ride in all weather conditions, compared to most electric scooters or boards that can only be safely used when the road is substantially dry and/or not raining.

Using a single large seal and no sealant compound to encapsulate the electronic components on a board or chip to provide the water proofing for entire sections of a scooter chassis results in an unreliable seal that most likely could not withstand brief submersions in water. Instead, creating multiple smaller modules and then sealing each individual module with its own O-ring/gasket/grommet seal and sealant compound results in a reliable seal for the electronics on the electric-powered personal transport vehicle 100 that can withstand brief submersions in water. Also, the above waterproofing strategy allows users to easily swap battery packs without compromising their electric-powered personal transport vehicle's 100 waterproof rating. Individual IPx7 sealing of battery pack allows a user to quickly swap their battery pack. Making multiple smaller modules each focusing on a separate control function for the electric-powered personal transport vehicle 100 makes easy rework and/or repair of electric-powered personal transport vehicles 100 by repair technicians.

As a tradeoff, making multiple smaller modules each focusing on a separate control function and then sealing each individual module with its own O-ring/gasket/grommet seal does increase the complexity of manufacturing an electric-powered personal transport vehicle 100.

Display

Figure 4:
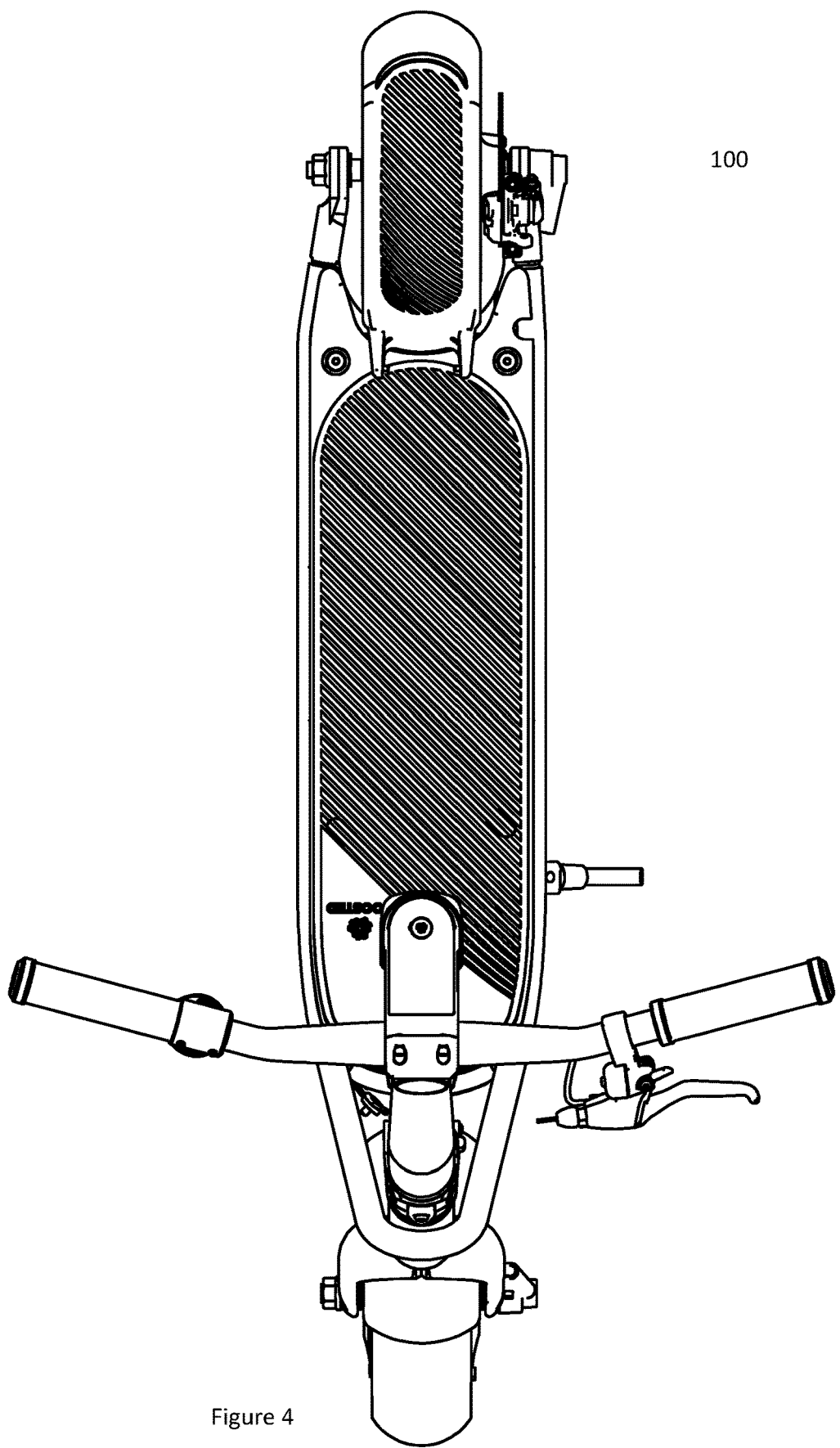
FIG. 4 illustrates a diagram of an example embodiment of an electric-powered personal transport vehicle having a display.
Figure 5:
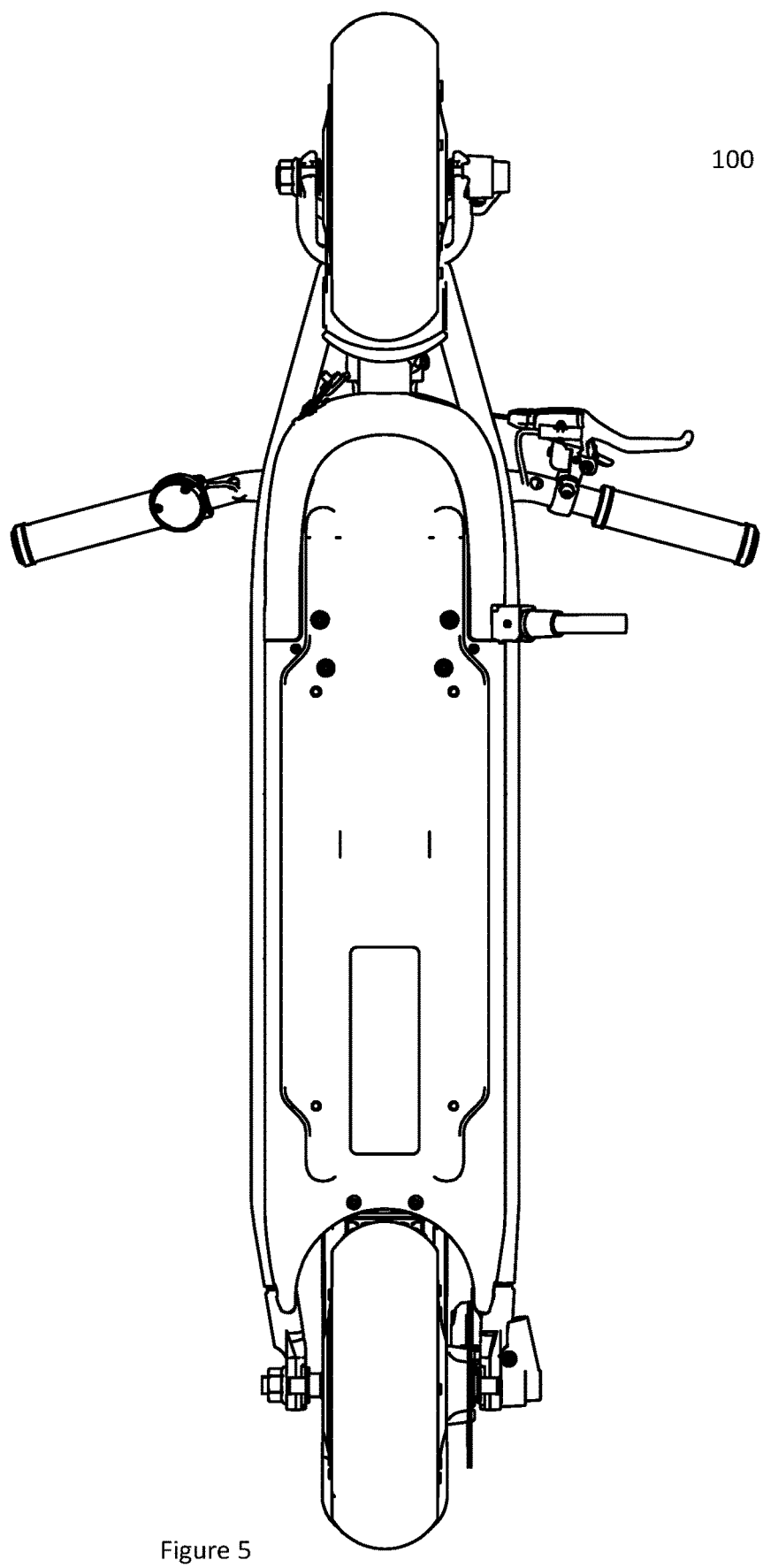
FIGS. 5 and 12 illustrate a diagram of an example embodiment of an electric-powered personal transport vehicle having an axle.

FIG. 4 illustrates an example embodiment of an electric-powered personal transport vehicle 100 having a display mounted in the center of the steer tube between the handle bars. The display screen can hide when the electric-powered personal transport vehicle 100 is in an off mode and can disappear into the deck latch mechanism. The display screen can have a waterproof assembly design. The display screen can have a UV hard coating to protect display screen from scratches. The display screen can display regenerative braking power and energy. The display screen can show remaining battery life and estimated travel distance capacity. The display screen can show the mode the vehicle is in at the moment. The display screen can show the state of the vehicle, such as locked or unlocked. The display may have an associated set of one or more control buttons forming a user interface for the electric-powered personal transport vehicle 100.

Remote Control for the Electric-Powered Personal Transport Vehicle

An example embodiment of the electric-powered personal transport vehicle 100 that may be controlled by a wireless remote control. The wireless remote control may be a stand-alone hand-held device (as shown) or in an embodiment a suitably programmed mobile computing device typically running a software application resident on that mobile computing device. In an example embodiment, the mobile computing device may be a smart phone, a smart watch, a tablet computer, etc. The mobile computing device may include a wireless transmitter, such as a radio antenna, for wirelessly communicating with the electric-powered personal transport vehicle 100. The wireless remote may use one or more antenna and/or transmission frequency to provide signals to the electric-powered personal transport vehicle 100. Communication may be one way, two way, or networked among multiple devices communicating together with each other and/or with the electric-powered personal transport vehicle 100. The electric-powered personal transport vehicle 100 can have a redundant sensor system and transmission system for remote. The electric-powered personal transport vehicle 100 can have security to lock and unlock operation of the electric-powered personal transport vehicle 100, to turn on and turn off the electric-powered personal transport vehicle 100, and alarm functions if the electric-powered personal transport vehicle 100 is being moved or shaken when in a locked or off state.

Sensor Feedback Network for the Electric-Powered Personal Transport Vehicle

FIG. 11 illustrates an exploded view of an example embodiment of an electric-powered personal transport vehicle 100 having sensors. The electric-powered personal transport vehicle 100 may have a sensor feedback network integrated into the electric-powered personal transport vehicle 100. The electric-powered personal transport vehicle 100 may have different sensors, such as one or more of vibration, accelerometers, gyros, GPS, temperature, humidity, ambient light, and other sensors integrated into components of the board to collect information that is fed back. The sensor feedback network for the electric-powered personal transport vehicle 100 can be waterproofed as discussed above. The information may be fed back to various components on the board, such as the controller, as well as to an external network. The sensors may be used to create features for users of the electric-powered personal transport vehicle 100, such as best routes, best times to ride, safety warnings, and others. For example, the vibration, accelerometer, gyros, and GPS sensors may collect information on the route and the user riding habits to send feedback to the user and supply empirical data about road conditions to a central community server to track road conditions. The information about local road conditions specific to that user may be downloaded and supplied to the electric-powered personal transport vehicle 100 so that the board can use the GPS to give the user information on upcoming road conditions. Likewise, various components can convey information to the user. For example, a speaker in the wireless remote can be installed to play music or make sounds to convey information about the motors or other parts of the board, and/or convey navigation information to the user. Similarly, the haptic motor in the wireless remote can communicate information to the user, with possibly some LED's built into the remote to convey additional information. Additionally, even without a sensor system, a community board can be set up to collect user input on road conditions and then broadcast that information to the on-board app system for the electric-powered personal transport vehicles 100 and use their GPS to alert the user to local road conditions. The electric-powered personal transport vehicle 100 may have additional sensors such as an antitheft system, built into the wireless remote and/or software for the motor, that perform an identity check on the user (set of authorized users) before allowing the motor to drive the wheels.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:
an electric-powered personal transport vehicle with a board to support a weight of a user, one or more wheels driven by one or more electric motors,
wherein the electric motors are powered by one or more batteries; and
a throttle with a thumb wheel speed controller on a handlebar,
wherein the thumb wheel speed controller has a horizontal manipulation between accelerate, neutral, and brake input positions, and
wherein the thumb wheel speed controller is configured such that pressing the thumbwheel speed controller in a vertical direction will not result in an unintentional acceleration or braking.

2. The apparatus of claim 1, further comprising:
individually sealed electronic modules, as well as a vehicle chassis that is configured to intentional drain off water collected therein,
wherein the sealed electronic modules are sealed with a sealant.

3. The apparatus of claim 1, further comprising:
a multiple piece split rim,
wherein the split rim is configured to contain a motor within a hub, and
wherein the motor, in an outer diameter of the split rim, is configured to either:
i) extend flush across its surface with the respect to an inner portion of a tire attached to the split rim, or
ii) extend its surface into an air space in the inner portion of the tire,
wherein removing a depression typically found in the outer diameter of other rims allows for a larger motor for a same wheel diameter.

4. The apparatus of claim 1, further comprising:
a regenerative braking system for the one or more wheels driven by the one or more electric motors,
wherein a heat dissipation controller has a braking power management algorithm that factors in a throttle command input, vehicle battery state, and motor control in order to determine power distribution, when braking, between:
i) the electric motors to drive the wheels,
ii) the battery's charge state and charge rate, and
iii) a heat dissipation of excess power into a frame of the electric-powered personal transport vehicle via a heat dissipation mechanism.

5. The apparatus of claim 4, further comprising:
a battery pack that contains a set of battery cells with a power density to supply at least a 700 watt continuous motor in each wheel and a peak power value of at least 1500 watts,
wherein the heat dissipation controller is configured to rely on battery power capability to dictate what amount of power is to be routed to the motors and to the frame,
wherein the heat dissipation controller is coupled to one or more temperature sensors to determine a temperature of one or more of the battery cells and a sensor to determine a charge level of a given battery cell, and
wherein the heat dissipation controller is configured to determine the power distribution between the battery cells and the frame when braking to ensure no battery cell exceeds a temperature limit and a charge limit for that battery cell by heat dissipation of the excess power into the frame of the electric-powered personal transport vehicle via the heat dissipation mechanism.

6. The apparatus of claim 1, further comprising:
wherein each motor has a motor driver housing, where the motor driver housing contains a printed circuit board with its controller and other electronic components, and is mounted inside of the motor stator.

7. The apparatus of claim 6, further comprising:
a hollow axle configured to allow cables from that motor to pass through a sealed housing of its corresponding motor driver housing,
wherein the integrated motor and motor driver are configured to use the hollow axle and the motor stator as a heat sink for heat coming from the motor driver's printed circuit board.

8. The apparatus of claim 1, further comprising:
a motor axle that is configured to be split crosswise into multiple axle segments,
wherein each segment is configured to fasten directly to a motor stator,
wherein a first axle segment has a plate to clamp onto the motor stator and sink heat out of stator windings of the motor stator.

9. The apparatus of claim 1, further comprising:
a spring damper configured to assist in providing ride stability,
wherein a steer tube has the spring damper,
wherein the spring damper is configured to provide a spring force to cause handlebars to return to a center position with respect to a center line of the electric-powered personal transport vehicle.

10. The apparatus of claim 1, wherein the thumb wheel speed controller is configured to have a knurled texture and to use magnets to detect a current position of the thumb wheel relative to the accelerate input position, the neutral input position, and the brake input position.

11. A method for an electric-powered personal transport vehicle, comprising:
constructing the electric-powered personal transport vehicle with a board to support a weight of a user, one or more wheels driven by one or more electric motors, and
wherein the electric motors are powered by one or more batteries; and
constructing a throttle with a thumb wheel speed controller on a handlebar,
wherein the thumb wheel speed controller has a horizontal manipulation between accelerate, neutral, and brake input positions, and
wherein the thumb wheel speed controller is configured such that pressing the thumbwheel speed controller in a vertical direction will not result in an unintentional acceleration or braking.

12. The method of claim 11, further comprising:
constructing individually sealed electronic modules and constructing a vehicle chassis that has intentional water drainage,
wherein the sealed electronic modules are sealed with a sealant.

13. The method of claim 11, further comprising:
constructing a multiple piece split rim,
wherein the split rim is configured to contain a motor within a hub, and wherein the motor, in an outer diameter of the split rim, is configured to either:
  i) extend flush across its surface with the respect to an inner portion of a tire attached to the split rim, or
  ii) extend its surface into an air space in the inner portion of the tire,
wherein removing a depression typically found in the outer diameter of other rims allows for a larger motor for a same wheel diameter.

14. The method of claim 11, further comprising:
constructing a regenerative braking system for the one or more wheels driven by the one or more electric motors,
wherein a heat dissipation controller has a braking power management algorithm that factors in a throttle command input, vehicle battery state, and motor control in order to determine power distribution, when braking, between:
  i) the electric motors to drive the wheels,
  ii) the battery's charge state and charge rate, and
  iii) a heat dissipation of excess power into a frame of the electric-powered personal transport vehicle via a heat dissipation mechanism.

15. The method of claim 14, further comprising:
constructing a battery pack that contains a set of battery cells with a power density to supply at least a 700 watt continuous motor in each wheel and a peak power value of at least 1500 watts,
wherein the heat dissipation controller is configured to rely on battery power capability to dictate what amount of power is to be routed to the motors and to the frame,
wherein the heat dissipation controller is coupled to one or more temperature sensors to determine a temperature of one or more of the battery cells and a sensor to determine a charge level of a given battery cell,
wherein the heat dissipation controller is configured to determine the power distribution between the battery cells and the frame when braking to ensure no battery cell exceeds a temperature limit and a charge limit for that battery cell by heat dissipation of the excess power into the frame of the electric-powered personal transport vehicle via the heat dissipation mechanism.

16. The method of claim 11, further comprising:
wherein each motor has a motor driver housing,
wherein the motor driver housing contains a printed circuit board with its controller and other electronic components, and is mounted inside of the motor stator.

17. The method of claim 16, further comprising:
constructing a hollow axle to allow cables from that motor to pass through a sealed housing of its corresponding motor driver housing,
wherein the integrated motor and motor driver are configured to use the hollow axle and the motor stator as a heat sink for heat coming from the motor driver's printed circuit board.

18. The method of claim 11, further comprising:
constructing a motor axle that is split crosswise into multiple axle segments,
wherein each segment is configured to fasten directly to a motor stator,
wherein a first axle segment has a plate to clamp onto the motor stator and sink heat out of stator windings of the motor stator.

19. The method of claim 11, further comprising:
constructing a spring damper to assist in providing ride stability,
wherein a steer tube has the spring damper,
wherein spring damper is configured to provide a spring force to cause handlebars to return to a center position with respect to a center line of the electric-powered personal transport vehicle.

20. The method of claim 11, further comprising:
constructing the thumb wheel speed controller to have a knurled texture and to use magnets to detect a current position of the thumb wheel relative to the accelerate input position, the neutral input position, and the brake input position.

* * * * *